(12) United States Patent
Pajovic et al.

(10) Patent No.: US 9,948,754 B2
(45) Date of Patent: Apr. 17, 2018

(54) SYSTEM AND METHOD FOR DECODING ASYNCHRONOUSLY TRANSMITTED PACKETS

(71) Applicant: Mitsubishi Electric Research Laboratories, Inc., Cambridge, MA (US)

(72) Inventors: Milutin Pajovic, Cambridge, MA (US); Gal Shulkind, Somerville, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 128 days.

(21) Appl. No.: 15/047,510

(22) Filed: Feb. 18, 2016

(65) Prior Publication Data

US 2017/0244815 A1 Aug. 24, 2017

(51) Int. Cl.
*H04W 4/00* (2009.01)
*H04L 29/06* (2006.01)
*H04L 12/741* (2013.01)
*H04W 28/04* (2009.01)

(52) U.S. Cl.
CPC .............. *H04L 69/22* (2013.01); *H04L 45/74* (2013.01); *H04W 28/046* (2013.01)

(58) Field of Classification Search
CPC ....... H04L 69/22; H04L 45/74; H04W 28/046
USPC ................ 370/338, 328, 329, 330, 252, 254
See application file for complete search history.

(56) References Cited

U.S. PATENT DOCUMENTS

| 5,657,326 | A | 8/1997 | Burns et al. |
| 5,940,400 | A | 8/1999 | Eastmond et al. |
| 7,433,396 | B2 | 10/2008 | Roy |
| 2007/0206664 | A1 | 9/2007 | Grant et al. |
| 2015/0304125 | A1* | 10/2015 | Nee .......................... H04L 5/16 370/294 |
| 2016/0119023 | A1* | 4/2016 | Zhang .................. H04B 1/7117 375/148 |
| 2017/0054809 | A1* | 2/2017 | Baptist ................ H04L 67/1097 |
| 2017/0223653 | A1* | 8/2017 | Weitnauer ........... H04W 56/002 |

OTHER PUBLICATIONS

Xiao Li et al. Compressive Link Acquisition in Multiuser Communications, IEEE Transactions on Signal Processing, vol. 61, No. 12, Jun. 1, 2013. pp. 3229-3245.

\* cited by examiner

*Primary Examiner* — Chuong T Ho
(74) *Attorney, Agent, or Firm* — Gene Vinokur; James McAleenan; Hironori Tsukamoto

(57) ABSTRACT

A method for decoding a set of packets asynchronously on same nominal carrier frequency transmitted over a common communication medium, receives a signal including a combination of the set of packets modified with noise of the common communication medium, each packet includes a preamble common to all packets in the set and a payload unique for at least some packets in the set. The method determines, using a sparse recovery, a frequency offset of the transmission of each packet from the carrier frequency, a time offset of the transmission of each packet from a common point in time, and a channel gain corresponding to the transmission of each packet over a channel in the common communication medium and decodes the payloads of the packets in the set using the frequency offsets, the time offsets, and the channel gains.

19 Claims, 25 Drawing Sheets

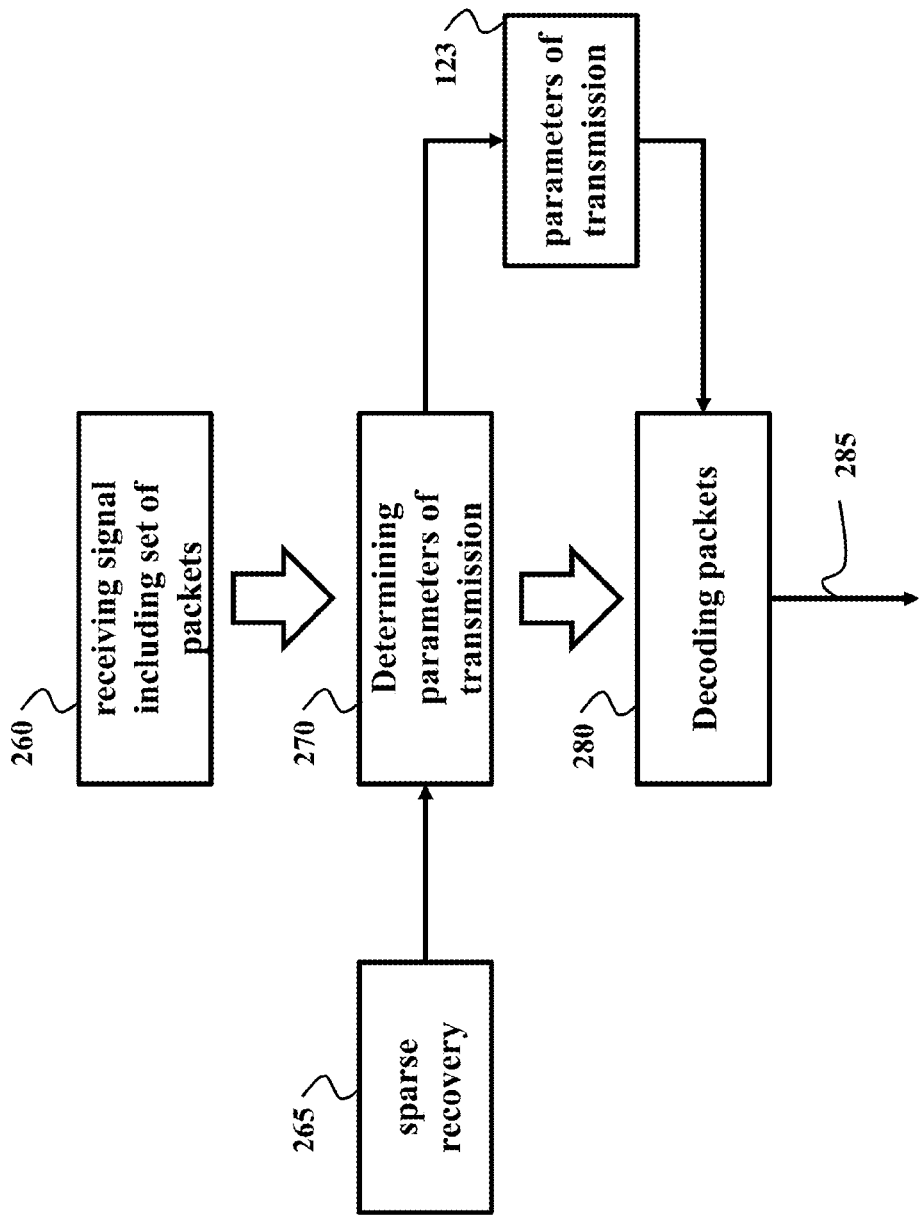

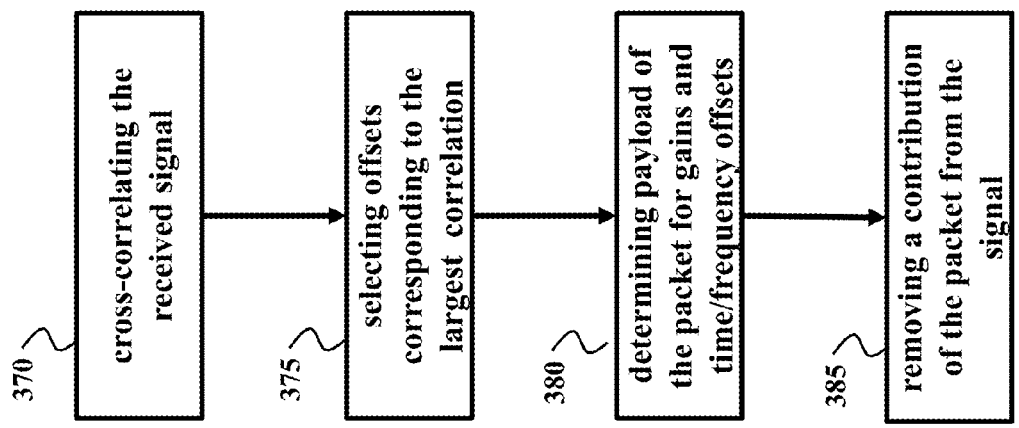

SYSTEM AND METHOD FOR DECODING ASYNCHRONOUSLY TRANSMITTED PACKETS

FIELD OF THE INVENTION

This invention relates generally to communications systems and more particularly to packet collision detection for decoding asynchronously transmitted packets in multi-user communication systems.

BACKGROUND OF THE INVENTION

Communications systems that employ a shared communications medium may, in certain circumstances, permit two or more users to transmit information at the same time. For example, multiple transmitters, such as vehicles in a Vehicle-to-Infrastructure (V2I) system, transmit communication signals asynchronously over a shared communications medium, e.g., in the same frequency band. A transmitted packet includes a preamble (known and same across transmitters) and payload which carries information symbols.

These asynchronous transmissions can cause multiple transmitted packets to overlap in time upon arrival at a designated receiver, which gives rise to packet collision. At the receiver, such overlapping transmissions combine to form a composite signal. When a collision occurs, the multiple transmissions interfere with each other in a manner that can prevent the reception of a portion or all of the information in these transmissions.

Recovery from a collision requires the retransmission of information by users. Unfortunately, as collision probability increases, so does the expected number of the retransmissions. If the number of retransmissions becomes excessive, latencies associated with the transfer of information increase and communications capacity is wasted.

To reduce the amount of wasted capacity, many communications systems are able to adjust their parameters to optimize performance. For example, certain TDMA systems are able to dynamically adjust the number of allocated contention time slots to keep collision rates, often measured in collisions per second, within an acceptable range.

Thus, to effectively control collision rates, a communications system needs to accurately detect collisions. Conventional collision detection techniques do not provide great accuracy. For example, one such technique detects collisions based solely on received signal power. According to this technique, a collision is detected when one or more power measurements are above a certain level.

This power-based technique disadvantageously assumes that all signals have the same power and detect collision by detecting jumps in the power of the received signal. However, normal transmit power variations, as well as gains of different channels that different packets are transmitted over, may corrupt such collision detection process. In addition, frequency offsets between two or more colliding signals can result in a combined signal that does not have an increased power level within the observation window, thereby leading to an inaccurate estimates of the time instant at which collision occurs. Finally, the power based technique fails to detect a substantial number of collisions in a way that such failures result in collision rate overestimation or underestimation, which leads to ineffective contention slot allocation decisions.

Accordingly, there is a need for a system and a method to determine the collision in the presence of amplitude, frequency, and timing offsets.

SUMMARY OF THE INVENTION

Some embodiments of the invention are based on recognition that packets transmitted over a shared communication medium have, in general, different relative time offsets and exhibit different frequency offsets due to clock imperfections and/or relative motion between the transmitters and the receiver. If those frequency and time offsets are known, the collided packets can, in general, be decoded. However, there are quite a number of different combinations of time-frequency offsets. In such a manner, a disadvantage of the unpredictability of the frequency and time offsets can be turned into an advantageous knowledge that collided packets can be separated based on different frequency and time offsets, and in turn, decoded.

Some embodiments of the invention are based on realization that transmission of the packets in the space of the time-frequency offsets is sparse. For example, there can be tens of thousands of different combinations of the time-frequency offsets and only ten concurrently transmitted packets. To that end, some embodiments address the problem of determining the combinations of the time and frequency offsets of the transmitted packets as a sparse recovery problem, where each atom of the sparse recovery encodes time offset, frequency offset and indirectly payload symbols.

The sparse recovery searches among all possible atoms defined by the combination of the parameters of transmission and different payloads of the packets. Because there are too many payload possibilities, some embodiments approximate the values of the payloads. For example, one embodiment uses only the preamble of the packets for the sparse recovery. Additionally or alternatively, another embodiment uses a combination of the preamble with payloads approximated with likely payloads for each combination of the frequency offset and the delay. Such a payload, together with corresponding delay and frequency offsets constitute an approximate atom. To that end, some embodiments use sparse recovery with approximate atoms.

Accordingly, one embodiment discloses a method for decoding a set of packets asynchronously transmitted on a nominal carrier frequency over a common communication medium. The method includes receiving a signal including a combination of the set of packets modified with noise of the common communication medium, each packet includes a preamble common to all packets in the set and a payload unique for at least some packets in the set; determining, using a sparse recovery, a frequency offset of the transmission of each packet from the carrier frequency, a time offset of the transmission of each packet from a common point in time, and a channel gain corresponding to the transmission of each packet over a channel in the common communication medium; and decoding the payloads of the packets in the set using the frequency offsets, the time offsets, and the channel gains.

Another embodiment discloses a receiver for decoding a set of packets asynchronously transmitted a nominal carrier frequency over a common communication medium. The receiver includes an antenna to receive the set of packets asynchronously transmitted over the common communication medium; a front end to produce a signal including a combination of the set of packets modified with noise in the common communication medium, wherein each packet includes a preamble common for all packets in the set and a payload unique for at least some packets in the set; a channel estimator, including a processor and a memory, to determine, using a sparse recovery, a frequency offset of the transmission of each packet from the carrier frequency, a time offset of the transmission of each packet from a common point in time, and a channel gain corresponding to the transmission of each packet over a channel in the common communication medium; and a decoder to decode the payloads of the packets in the set using the frequency offsets, the time offsets, and the channel gains.

Yet another embodiment includes a computer implemented method for decoding a set of packets asynchronously transmitted on a nominal carrier frequency, comprising a processor for performing steps of the method. The method includes determining, for each transmitted packet including a preamble common for all packets in the set and a payload unique for at least some packets, a frequency offset of the transmission of the packet from the carrier frequency, a time offset of the transmission of the packet from a common point in time, and a channel gain corresponding to the transmission of the packet, wherein the determining uses a sparse recovery with a dictionary matrix based only on the preamble of the packets or based on a combination of the preamble with payloads approximated for each combination of the frequency offset and the delay; and decoding the set of packets using corresponding frequency offsets, delays, and channel gains.

BRIEF DESCRIPTION OF THE DRAWINGS

FIG. 2C is a block diagram of a method for decoding a set of packets asynchronously transmitted over a common communication medium according to some embodiments of the invention;

FIG. 3D is a block diagram of one iteration of the sparse recovery method according to one embodiment of the invention;

DETAILED DESCRIPTION OF THE PREFERRED EMBODIMENT

Figure 1A:
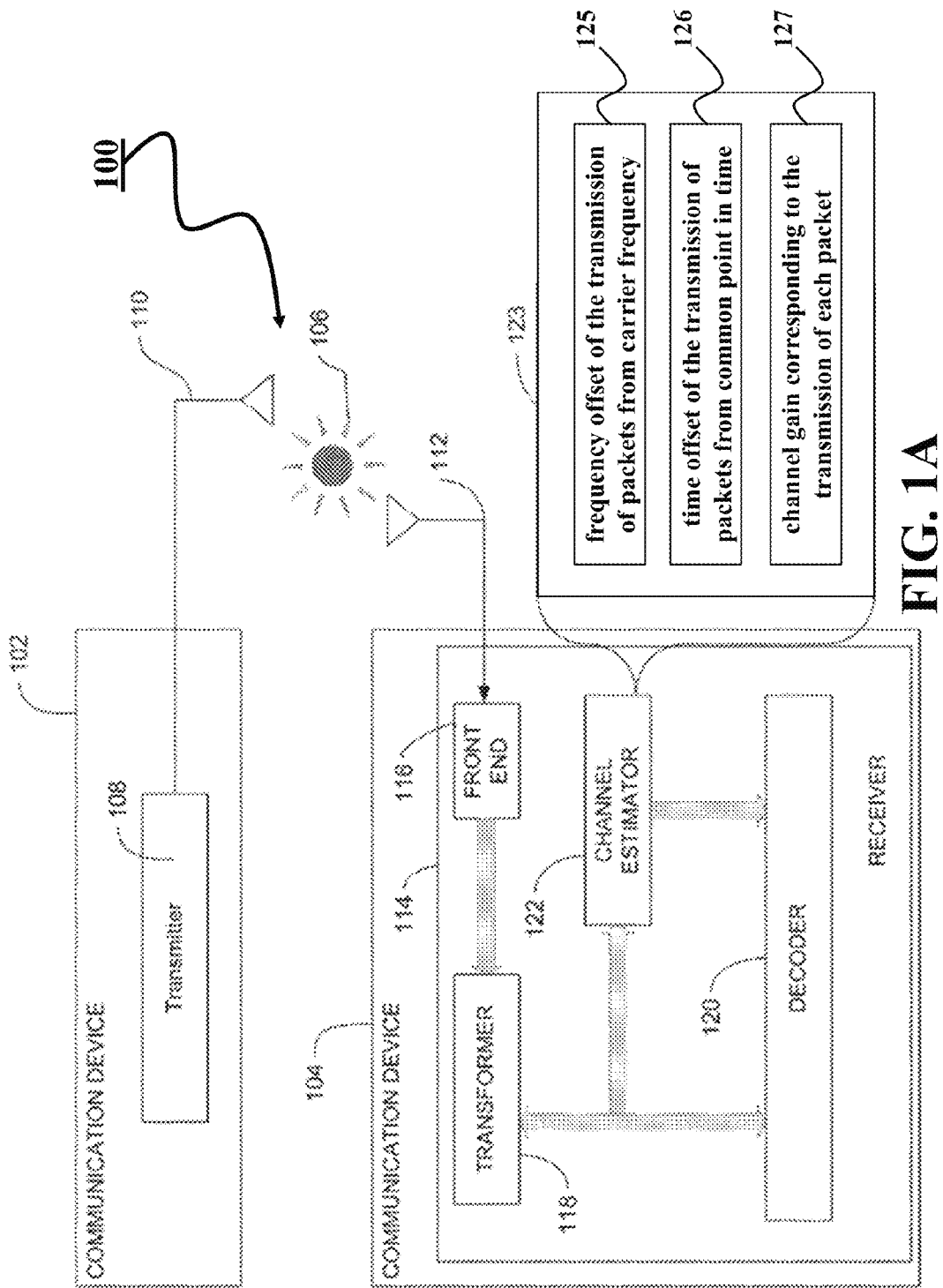
FIG. 1A is a schematic of a wireless communication system in accordance with one embodiment of an invention.

FIG. 1A shows a schematic of a wireless communication system 100 in accordance with one embodiment of an invention. The communication system 100 includes at least one first communication device 102 able to communicate using some carrier frequency with a second communication device 104 over a common communication medium 106. The communication medium 106 can include any types of wireless channels suitable for concurrent communication among multiple communication devices.

Figure 1B:
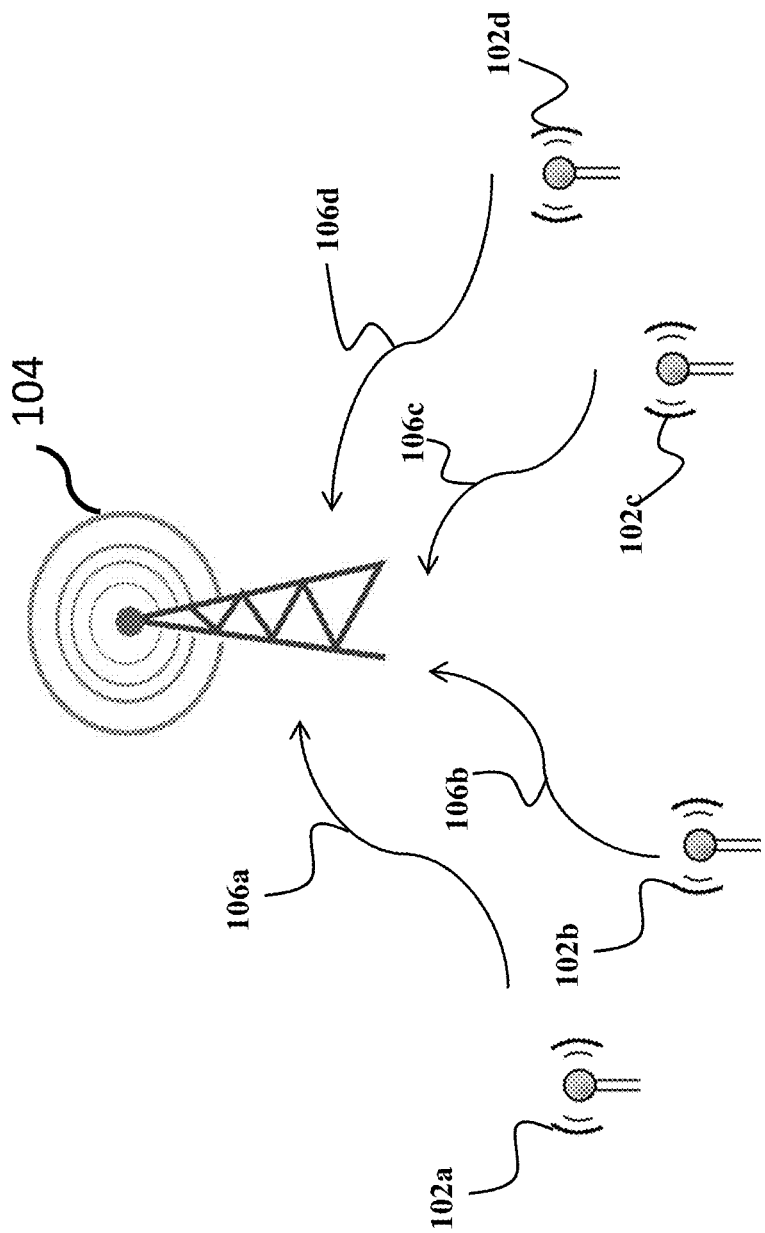
FIG. 1B is an exemplar transmission from multiple communication devices according to some embodiments of the invention.

FIG. 1B shows an exemplar transmission from multiple communication devices 102a, 102b, 102c, and 102d according to some embodiments of the invention. The packets from the communication devices 102a, 102b, 102c, and 102d are asynchronously transmitted on the same nominal carrier frequency over the communication medium 106. In this example, the receiving communication device 104 can be part of a base station in a cellular communication system, access point in a wireless local area network (WLAN), road-side unit (RSU) in a vehicle-to-infrastructure (V2I) communication system, etc. The transmitting communication devices can be part of mobile phone, smart phone, and communication system of moving vehicles.

Each transmission is performed within the communication medium 106 but according to different parameters of the transmission. Those parameters of transmission form different channels 106a, 106b, 106c, and 106d within the common communication medium 106. Examples of the parameters of transmission include time and frequency offsets and channel gains.

Figure 1C:
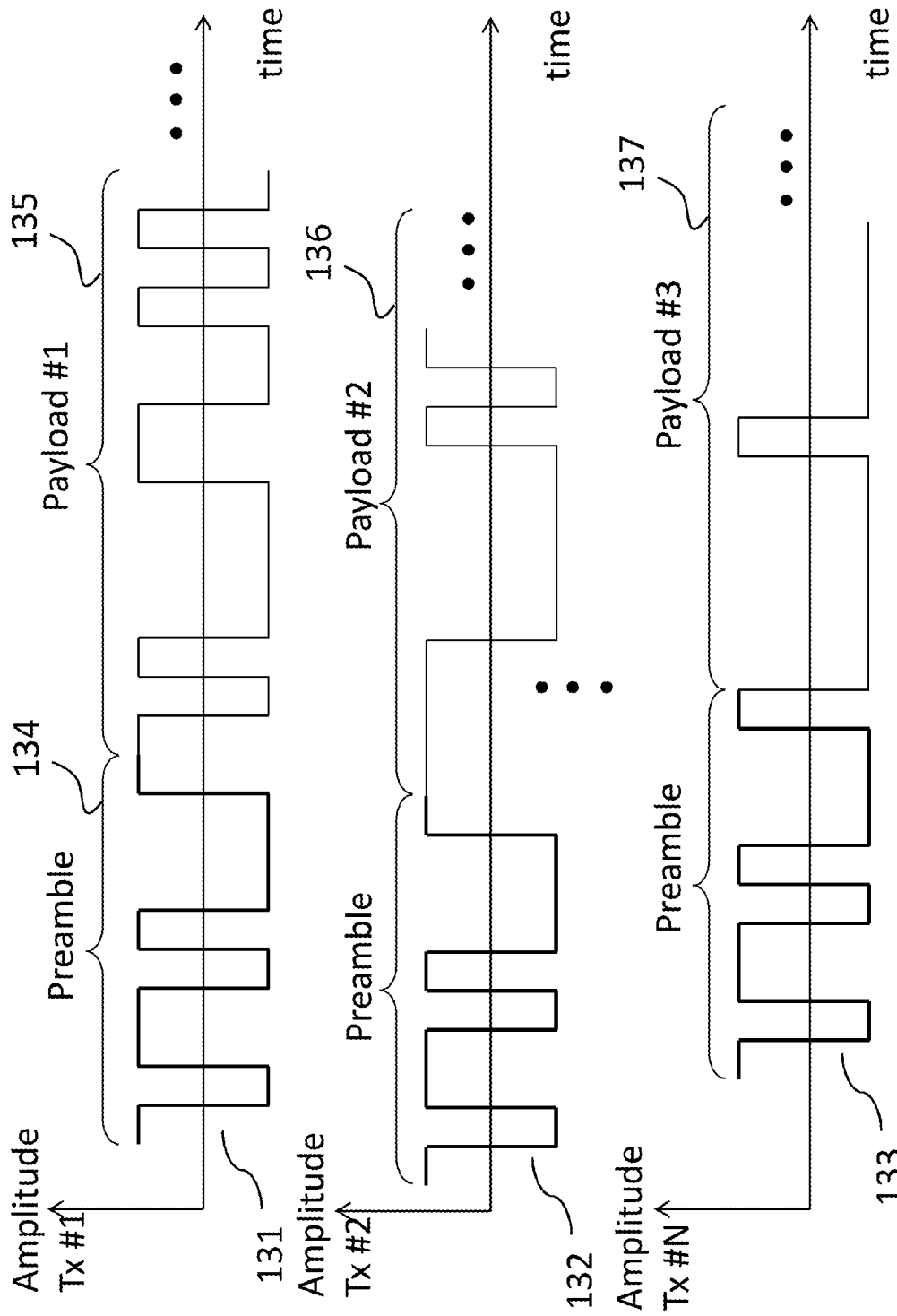
FIG. 1C is schematics of the packets asynchronously transmitted from the transmitting devices to the receiving device according to some embodiments of the invention.

FIG. 1C shows schematics of the packets 131, 132, and 133 asynchronously transmitted from the transmitting devices to the receiving device 104. Each packet includes a preamble 134 common to all packets in the set and a payload 135, 136, and 137 unique for at least some packets in the set. Each payload carries a random sequence of symbols which encodes message aimed for transmission.

For example, the transmitting device 102 includes an antenna 110 and the receiving device 104 includes an antenna 112 to transmit a single data stream over the communication medium 106. Although the scope of the present invention is not limited in this respect, types of antennas used by various embodiments for antennas 110 and/or 112 include but are not limited to internal antenna, dipole antenna, omni-directional antenna, a monopole antenna, an end fed antenna, a circularly polarized antenna, a micro-strip antenna, a diversity antenna and the like.

The communication devices, e.g., the device 102 and/or the devices 102a, 102b, 102c, and 102d, include a transmitter 108 to transmit packets via antennas 110, respectively. The communication device 104 includes a receiver 114 to receive the signal over the communication medium 106 via antenna 112. The received signal includes a combination of the set of packets asynchronously transmitted by the devices 102a, 102b, 102c, and 102d and modified with noise of the communication medium 106.

In some embodiments, the receiver 114 includes a front end 116 and/or a transformer 118. The front end 116 can include any suitable front end module to convert a time-domain signal received from antenna 112 into a time-domain signal of a format suitable for transformer 118. Transformer 118 may transform the signal into a plurality of different types of signals that are suitable for a decoder 120 or a channel estimator 122. For example, the frond end can convert the received signal into a set of samples suitable for further processing and decoding.

The receiver 114 also includes a channel estimator 122, including a processor and a memory, to determine parameters 123 of the transmission of the packets. The receiver 114 can also include a decoder 120 to decode the received signal using the parameters of transmission and to generate signal representing the packets.

In various embodiments, the channel estimator 122 uses a sparse recovery to determine the parameters 123 of the transmission, such as a frequency offset 125 of the transmission of each packet from the carrier frequency, a time offset 126 of the transmission of each packet from a common point in time, and a channel gain 127 corresponding to the transmission of each packet over a channel in the communication medium.

Some embodiments of the invention are based on recognition that packets transmitted over a common, i.e., shared, communication medium have, in general, different relative time delays and/or exhibit different frequency offsets due to clock imperfections and/or relative motion of the transmitters and the receiver. If those frequency and time offsets are known, the collided packets can be decoded.

However, there are quite a number of different combinations of time-frequency offsets. In such a manner, a disadvantage of the unpredictability of the frequency and time offsets can be turned into an advantageous knowledge that collided packets can be separated based on different frequency and time offsets, and in turn, decoded.

Figure 2A:
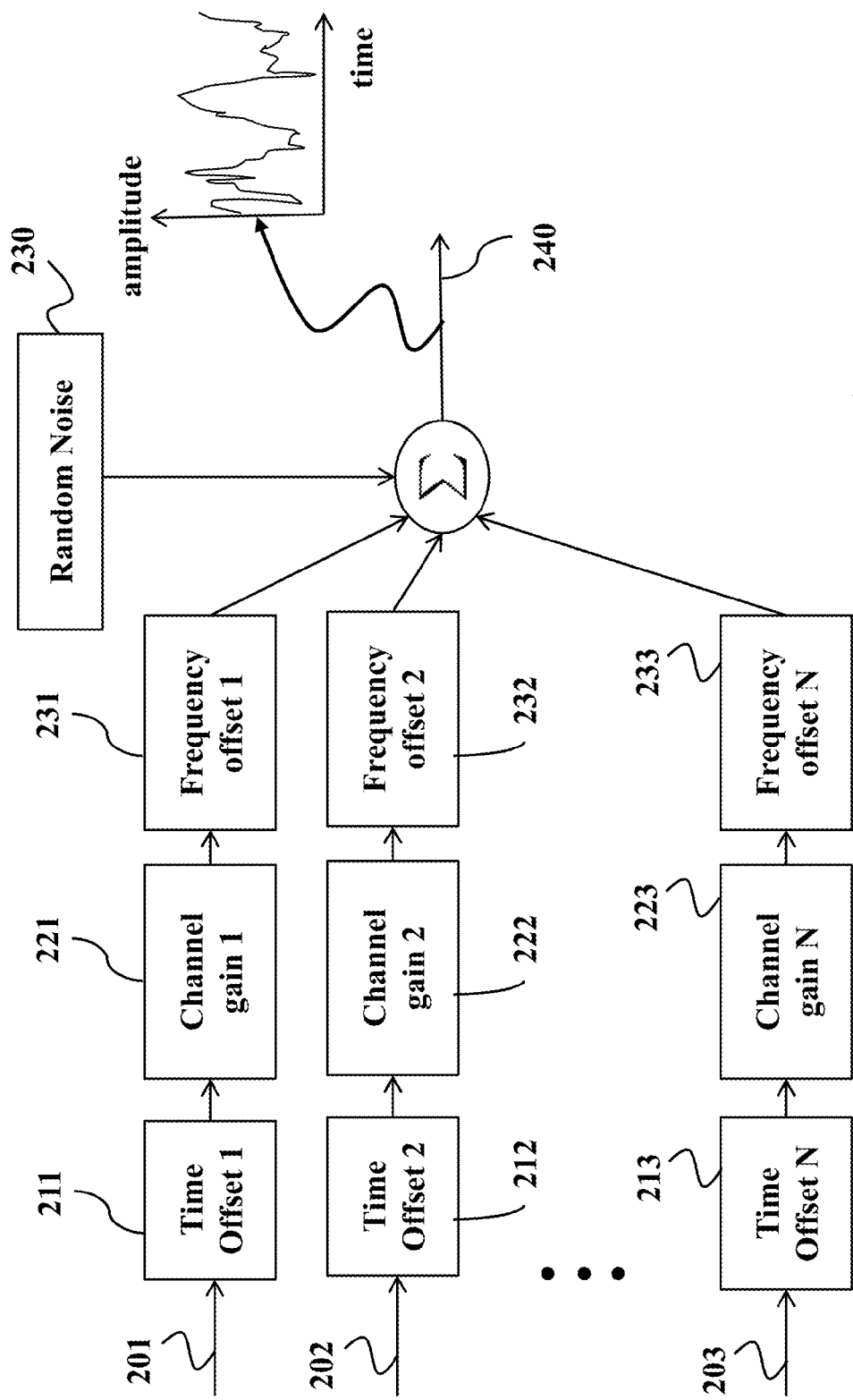
FIG. 2A is a schematic of asynchronous transmission of the packets over the communication channels having frequency offsets according to some embodiments of the invention.

FIG. 2A shows a schematic of asynchronous transmission of the packets using the same nominal carrier frequency over the communication channel according to some embodiments of the invention. Each transmitted packet experiences different parameters of the channel from the transmitting device to the receiving. As used in this description, the communication medium 106 is a common communication medium used for multiple asynchronous transmissions. Parameters of each transmission form a specific channel within the common communication medium.

The transmitted signal waveform and packet duration can be selected according to the prevailing channel conditions, as commonly done in a communication system design. For example, the packet length is selected such that the channel is time-invariant or slowly varying during the transmission of a packet. In other words, the time duration of a packet is shorter than the channel coherence time. Furthermore, the channel is frequency flat over the frequency bandwidth of the signal waveform. Additionally or alternatively, the signal waveform can be generated according to the e.g., Orthogonal Frequency Division Multiplex (OFDM) modulation such that the channel is frequency flat around each subcarrier. To that end, the channel is frequency flat over the frequency band of interest and time-invariant over the packet duration.

Each packet, e.g., packet 201, 201 or 203, experiences channel gain 221, 222, 223, respectively, during the transmission. In addition, due to asynchronous transmission, different packets have different, e.g., random, relative time offsets 211, 212, or 213 from a common point in time. Also, due to imperfect clocks in each communication device and/or motions of devices, each transmitted signal waveform experiences different, e.g., random, frequency offsets 231, 232, and 233, respectively. The signal 240 at the receiver is a superposition of noise 230 with each transmitted packet, randomly delayed in time, randomly offset in frequency and randomly scaled.

Figure 2B:
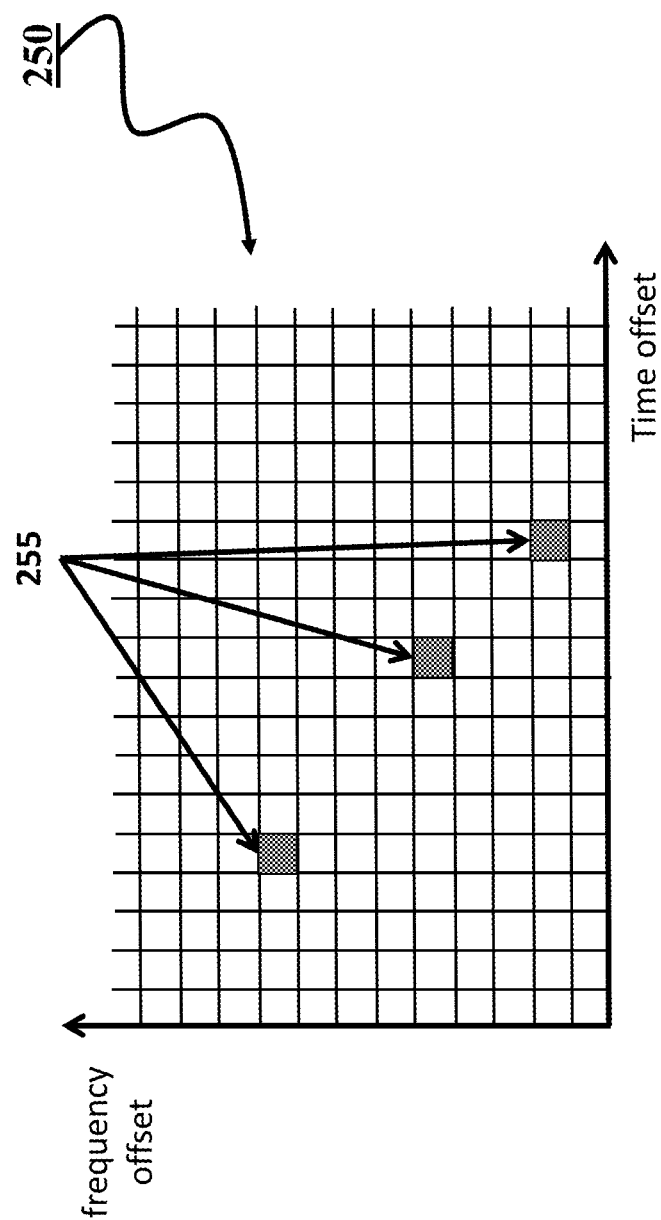
FIG. 2B is a schematic of a space of the time-frequency offsets in the common communication medium according to some embodiments of the invention.

FIG. 2B shows a schematic of a space of the time-frequency offsets 250 in the common communication medium according to some embodiments of the invention. Each bin 255 of the space 250 represents a combination of the time and frequency offsets of a particular channel in the common communication medium.

Some embodiments of the invention are based on realization that transmission of the packets in the space of the time-frequency offsets is sparse. For example, there can be tens of thousands of different combinations of the time-frequency offsets and only ten transmitted packets. To that end, some embodiments, address the problem of determining the combinations of the time and frequency offsets of the transmitted packets as a sparse recovery problem, where each atom of the sparse recovery encodes time offset, frequency offset and, directly or indirectly, payload symbols.

FIG. 2C shows a block diagram of a method for decoding a set of packets asynchronously transmitted on the same nominal carrier frequency over a common communication medium according to some embodiments of the invention. The method can be implemented using a processor of the receiver. The method receives 260 a signal including a combination of the set of packets modified with noise of the common communication medium. Each packet includes a preamble common to all packets in the set and a payload unique for at least some packets in the set. The preamble is known at the transmitter and the receiver.

The method determines 270, using a sparse recovery 265, the parameters 123 of the transmission of the packets. In various embodiments, the parameters 123 include a frequency offset of the transmission of each packet from the carrier frequency, a time offset of the transmission of each packet from a common point in time, and a channel gain corresponding to the transmission of each packet over a channel in the common communication medium. Next, the method decodes 280 the payloads 285 of the packets in the set using the frequency offsets, the time offsets, and the channel gains. The sparse recovery 265 searches among all possible atoms, i.e., combination of packets and parameters of transmission.

Figure 3A:
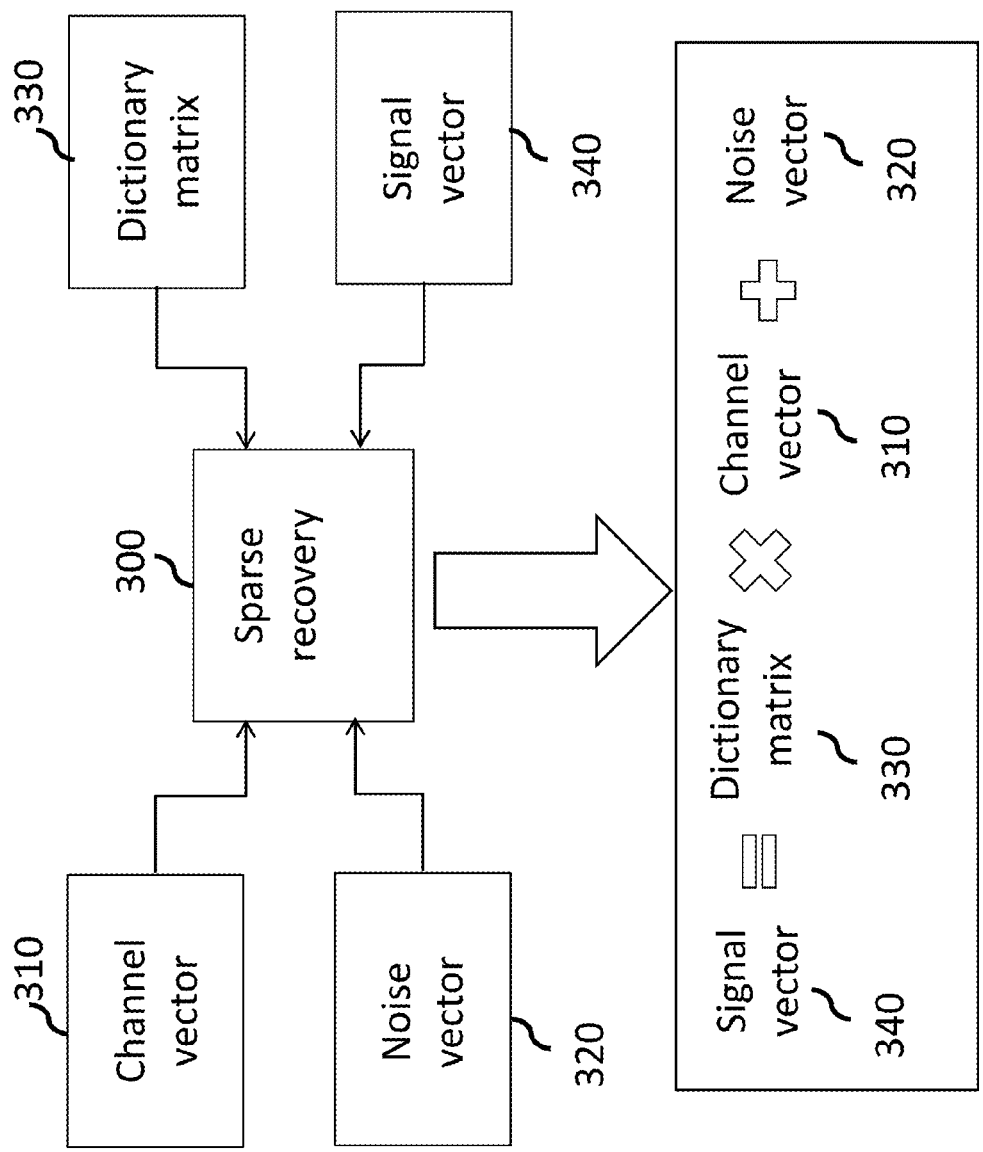
FIG. 3A is a schematic of a sparse recovery method according to one embodiment of the invention.

FIG. 3A shows a schematic of a sparse recovery 300 according to one embodiment of the invention. The signal vector 340 can be obtained by transforming the signal 240 using, e.g., the front end 116 and/or the transformer 118. The signal vector is represented as a product of a dictionary matrix 330 and a sparse channel vector 310, modified with noise 320.

In some embodiments, columns of the dictionary matrix are atoms which include possible values of different packets transmitted over channels defined by the bins from the space of time-frequency offsets. Also, the non-zero elements of the channel vector are the gains of the channels. The noise vector can be random, e.g., values of the noise vector can be Gaussian distributed. According to the sparse recovery formulation 300, the non-zero channel gains of the channel vector 310 indicates which atoms of the dictionary matrix are active, which in turn imply parameters of the transmission and the value of the packets.

Because there are too many payload possibilities, some embodiments of the invention approximate the payloads. For example, one embodiment uses only known preamble to approximate the packet transmitted over a channel. Another embodiment approximates the payload for each bin in the space of the time-frequency offsets, e.g., as if there is indeed a packet in that bin. To that end, in some embodiments, the sparse recovery 300 uses a dictionary matrix 330 approximated with the preamble of the packets, but without using the payloads of the packets, or approximated with a combination of the preamble with a single payload for each combination of the frequency and the time offsets.

Figure 3B:
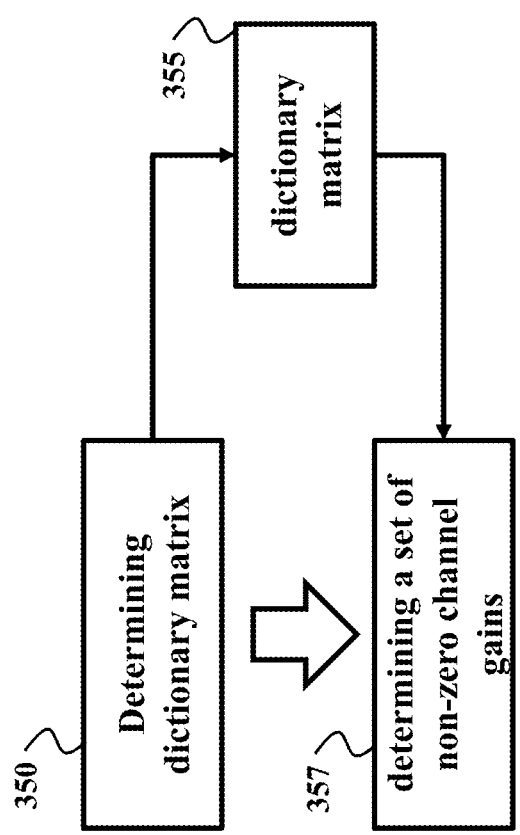
FIG. 3B is a block diagram of the sparse recovery method according to one embodiment of the invention.

FIG. 3B shows a block diagram of the sparse recovery method according to one embodiment of the invention. The embodiment determines 350 a dictionary matrix having only one atom for each combination of the frequency and the time offsets. Each atom of the dictionary 355 represents a packet having only the preamble and transmitted over a channel having a corresponding combination of the frequency and the time offsets. Further, the embodiment determines 357 a set of non-zero channel gains defining a set of atoms of the dictionary matrix, such that transmission of the atoms from the set with the corresponding non-zero channel gains approximates the received signal.

Figure 3C:
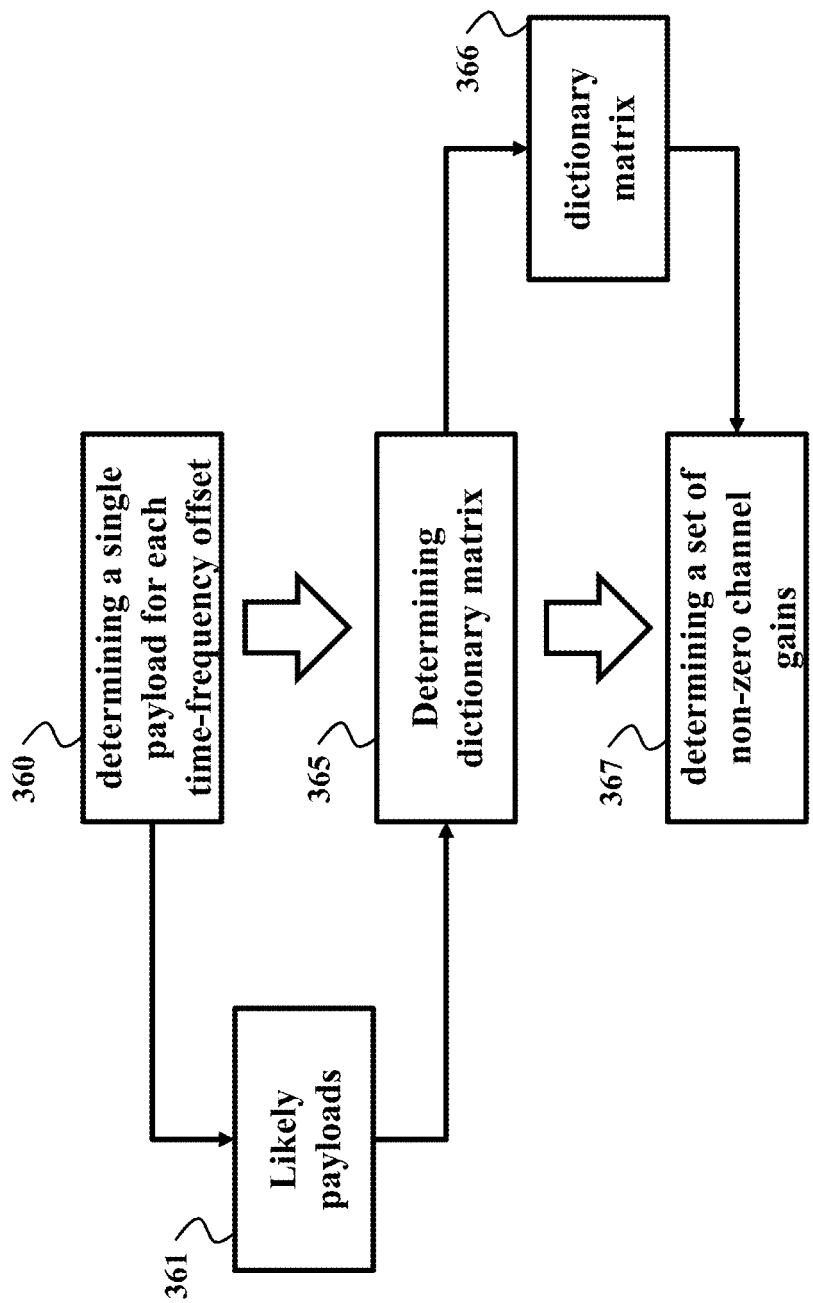
FIG. 3C is a block diagram of the sparse recovery method according to another embodiment of the invention.

FIG. 3C shows a block diagram of the sparse recovery method according to another embodiment of the invention. The embodiment determines 360 a single combination of the preamble with a payload 361 for each combination of the frequency and the time offsets. For example, the embodiment determines a most likely payload 361 as a single payload for each combination of the frequency and the time offsets. The most likely payloads are determined under assumption that the packet is indeed transmitted for the corresponding combination of the time and frequency offsets.

Next, the method determines 365 a dictionary matrix 366 having only one atom for each combination of the frequency and the time offsets. Each atom represents a packet including the preamble and the payload 361 determined for a corresponding combination of the frequency and the time offsets. The method further determines 367 a set of non-zero gains defining a set of atoms of the dictionary matrix, such that transmission of the atoms from the set with the corresponding non-zero gains approximates the received signal.

FIG. 3D shows a block diagram of one iteration of the sparse recovery method according to one embodiment of the invention. In this embodiment, the payloads are decoded iteratively within iterations of the sparse recovery until a termination condition is met.

The iteration cross-correlates 370 the received signal with each element of a dictionary matrix of the sparse recovery. Each element of the dictionary matrix is a possible packet transmitted over a channel for a combination of the frequency and the time offsets. Next, the iteration selects 375 the combination of the frequency and the time offset corresponding to the largest magnitude of the cross-correlation and determines 380 the payload of the packet transmitted over the channel for the selected combination of the frequency and the time offsets. In some embodiments, the iteration also removes 385 a contribution of the packet having the preamble and the payload and transmitted over the selected combination of the frequency and the time offsets from the received signal. In such a manner, the received signal is updated for subsequent iterations.

Exemplar Embodiments

Some embodiments of the invention perform multi-stage collision detection and decoding of the asynchronously transmitted packets. The first stage estimates the parameters of the collided packets (time offsets, frequency offsets and channel gains) and delivers initial estimates of the payloads of the packets. The methods implemented in this stage frame the packet collision problem as the problem of sparse representation of the received signal with atoms from redundant dictionary. The redundant dictionary is formulated based on known packet preambles, possible channel induced distortions and information symbol alphabet. Thus formulated, the estimates of the collided packet parameters and information symbols can, in principle, be obtained by employing one of many algorithms for sparse recovery.

However, direct application of a sparse recovery is computationally intractable due to an exponentially large dictionary, and the proposed methods introduce approximations to reduce the computational burden. In short, instead of operating with exact atoms, some embodiments represent a group of atoms with a single approximate atom. Therefore, the number of atoms is significantly reduced and a sparse recovery is performed on a polynomial (instead of exponentially) large number of atoms. Effectively, the proposed methods can be seen as sparse recovery methods with approximated atoms, as described above.

The second stage takes parameter estimates of the dominant atoms from the first stage and makes decision which atoms correspond to the transmitted packets and which atoms explain noise. This stage delivers the estimate of the number of collided packets. For example, one embodiment implements the second stage using a heuristic approach that considers powers and cross-correlations of the recovered atoms. Additionally or alternatively, another embodiment determines posterior distribution of the number of packets and delivers a Maximum Aposterior Probability (MAP) estimate for the number of collided packets.

The third stage takes estimates of the packet parameters and performs detection of the information symbols carried by the collided packets with the goal to improve the quality of symbol detection. This stage can implement joint detection of information symbols via belief propagation on a graph which takes into account symbol transitions controlled by the utilized pulse shaping as well as packet relative delays, frequency offsets and channel tap coefficients.

This stage improves the accuracy of the detected symbols relative to that achieved at the output of the first stage. Alternatively, this stage can implement a Successive Interference Cancellation (SIC) detection of symbols using the estimated packet parameters from the previous stages. The detection of payload symbols in each iteration (i.e., corresponding to each packet) can be done using the MMSE equalization or joint (Viterbi) detection.

Figure 4:
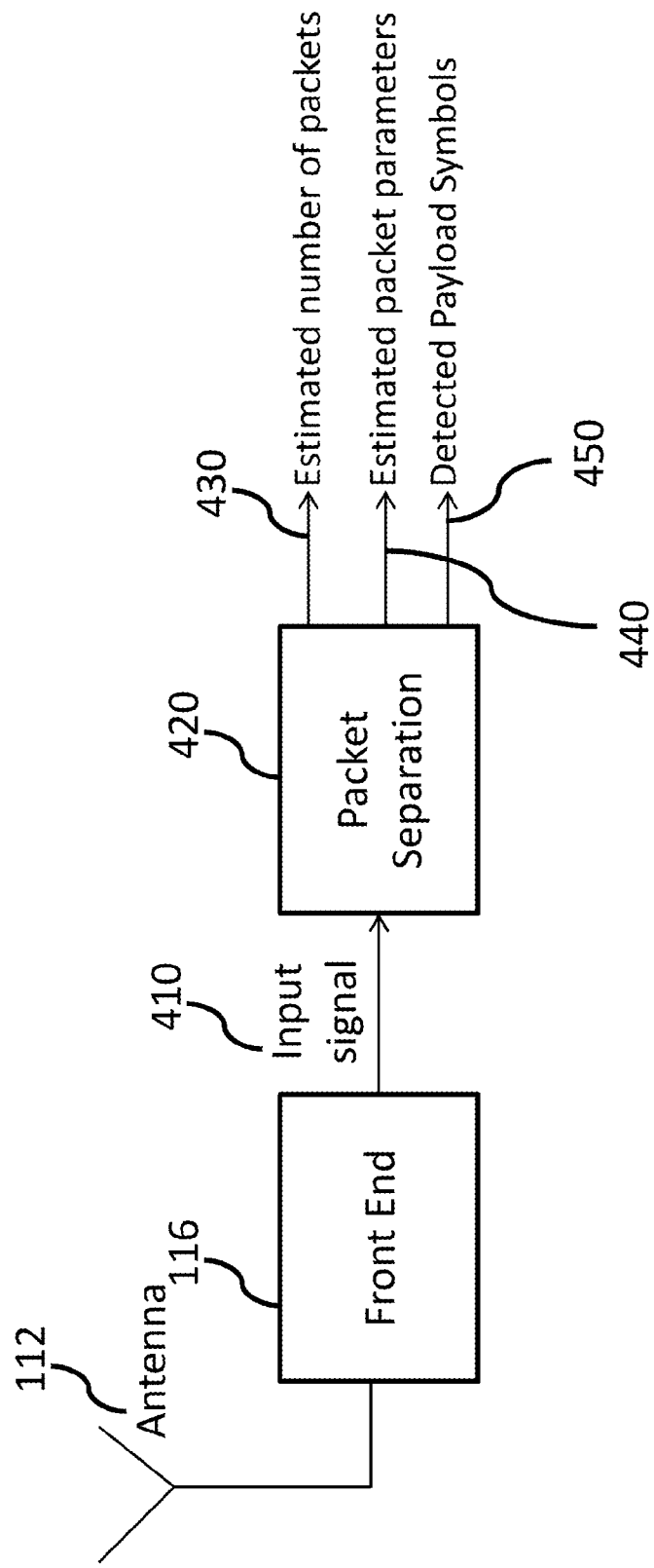
FIG. 4 is a block diagram of multi-stage packet collision detection according to one embodiment of the invention.

FIG. 4 shows a block diagram of multi-stage packet collision detection according to one embodiment of the invention. The signal including a set of packets is received with antenna 112 and processed through a frond end 116 to produce a signal 410 including a combination of the set of packets modified with noise in the common communication medium. The signal 410 is a digitized complex base-band signal. This signal 410 is processed by a packet separator 420 implemented using a processor to produce a number of detected packets 430, estimated packet parameters 440 such as packet time and frequency offsets and channel gains, as well as the detected payload symbols 450 of the extracted packets.

Figure 5:
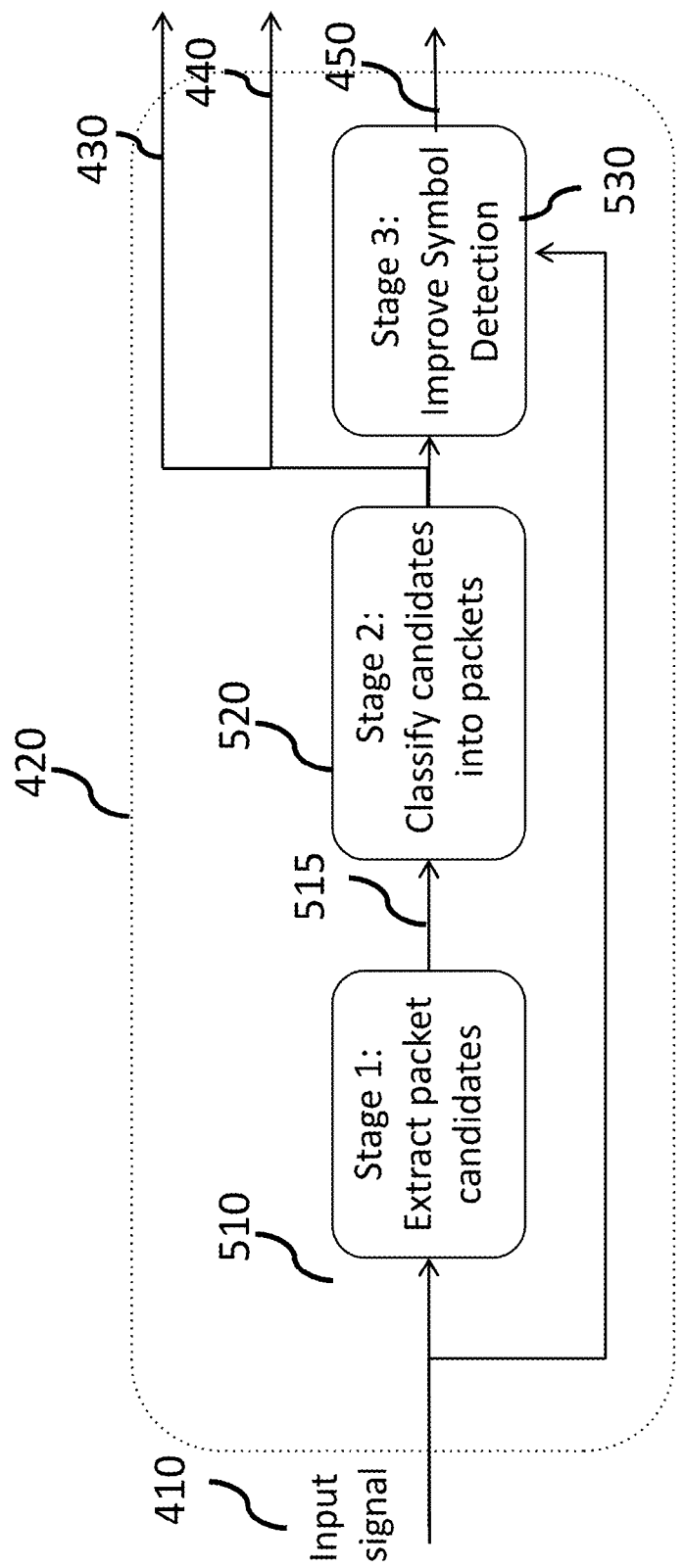
FIG. 5 is a diagram of a multi-stage packet separation according to one embodiment of the invention.

FIG. 5 shows a diagram of a packet separation according to one embodiment of the invention. In this embodiment, the packet separation includes three stages. The first stage 510 extracts a certain number of packet candidates from the input signal. By extracting a packet candidate, the embodiment estimates the time and frequency offsets, channel gain and detects payload symbols of a likely packet. The number of extracted packet candidates can be equal to the largest number of collided packets, which is application-specific and specified by a user. The second stage 520 classifies packet candidates into packets. In other words, this stage determines for each extracted packet candidate if it is indeed a packet and rejects the candidate packets that are unlikely to correspond to the transmitted packets. This stage outputs the final number of packets 430 and their corresponding parameters 440.

The third stage 530 detects payload symbols of the extracted packets 450. The first two stages also deliver payload symbol estimates. However, the purpose of the third stage is to improve symbol detection accuracy. Namely, while the symbol estimates of the earlier extracted packets in the first and the second stages are obtained from incomplete knowledge of channel gains corresponding to all packets, the third stage detects symbols using the final estimates of all packet parameters. The block diagrams of different embodiments of the first stage are shown in FIGS. 6A-6E.

For example, some embodiments use a mathematical model for the received signal. To simplify the disclosure, the example is provided in the continuous time domain representation. However, in some embodiments, the processing is performed in the discrete time, over the digitized samples of the complex base-band representation of the received signal.

The received signal r(t), includes K packets offset in time and frequency, is given by $$r(t)=\sum_{k=1}^{K} h_k s_k(t-\tau_k)e^{j2\pi f_k(t-\tau_k)}+v(t), \quad (1)$$

where $s_k(t)$, $h_k$, $\tau_k$ and $f_k$ are, respectively, the transmitted signal waveform, channel gain, delay and frequency offset corresponding to packet k, and v(t) is the noise. The noise modeled as i.i.d. circularly-symmetric Gaussian random variable of zero mean and variance $\sigma_v^2$, $v(t) \sim \mathcal{CN}(0, \sigma_v^2)$. The transmitted signal waveform $s_k(t)$ is given by $$s_k(t)=p(t)+g_k(t), \quad (2)$$

where p(t), $0 \leq t \leq T_p$, is modulated and encoded preamble of duration $T_p$, and $g_k(t)$, $T_p \leq t \leq T_p+T_g$, is modulated and encoded payload symbol sequence of duration $T_g$. The modulation and encoding are not restricted to any specific type and can be, for example, M-Phase Shift Keying (MPSK), M-Quadrature Amplitude Modulation (MQAM), Minimum Shift Keying (MSK), etc. The preamble waveform does not have to have index as it is the same across all K packets.

Figure 6A:
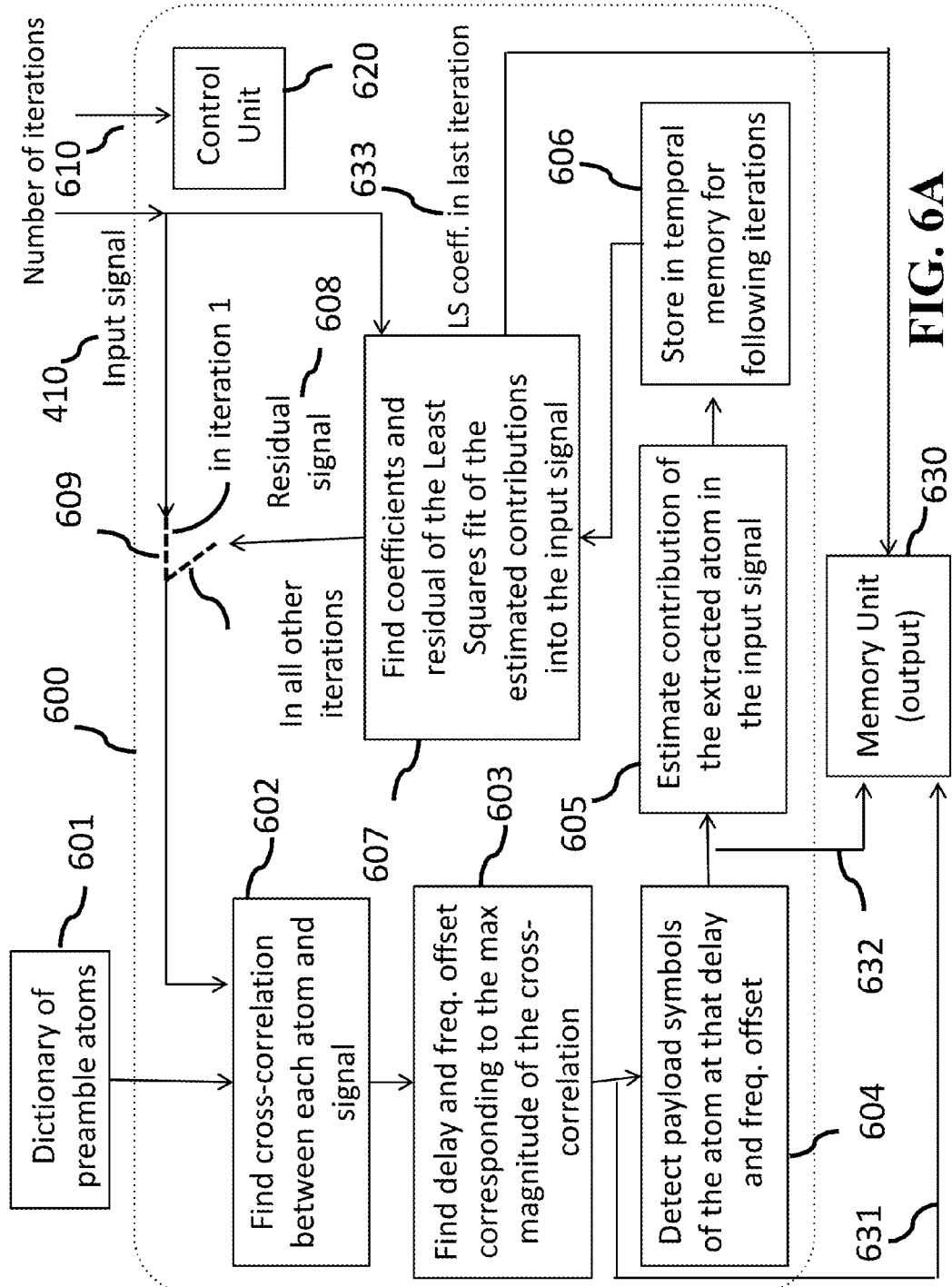
FIG. 6A is a block diagram of the sparse recovery method implemented during the first stage of the multi-stage packet separation according to one embodiment of the invention.

FIG. 6A shows a block diagram of the sparse recovery method implemented in the first stage according to one embodiment of the invention. In this embodiment, the input signal 410 is cross-correlated 602 with all elements from the dictionary matrix having atoms 601 determined based on the preamble of the packets. This dictionary is a set of possible template signals obtained by applying each possible delay and frequency offset to the preamble waveform. As such, an atom corresponding to ($\tau_l$, $f_l$) pair in this dictionary is obtained by applying delay $\tau_l$ and frequency offset $f_l$ to the preamble waveform p(t), $$a_l(t)=p(t-\tau_l)e^{j2\pi f_l(t-\tau_l)}. \quad (3)$$

The delay and frequency offset 631, which correspond to the largest magnitude of the cross-correlation, obtained in 603, are stored in the memory unit 630. Next, assuming that there is indeed a packet at such delay and frequency offset, the embodiment detects 604 its payload symbols 632, which are stored in the memory 630. The estimated delay, frequency offset and payload symbols correspond to one packet candidate.

The payload symbols 632 can be detected in a variety of ways, one of which includes extracting the portion from the input signal corresponding to the considered delay, compensating frequency offset using the considered frequency offset, estimating the channel gain from the known preamble and applying the MMSE filtering to obtain equalized signal. The payload symbols can be further estimated by downsampling the equalized signal and applying hard thresholding. Alternatively, one embodiment can use Viterbi detector if there is a memory in the symbol sequence, induced by the channel impulse response, shaping pulse, modulation format, or encoding scheme.

For example, let's denote with $\hat{\tau}$ and $\hat{f}$ the estimated time and frequency offsets of the extracted candidate packet in a particular iteration. The portion of the received signal r(t) corresponding to the extracted packet candidate is given by $$r_1(t)=r(t+\hat{\tau}), 0 \leq t \leq T_p+T_g. \quad (4)$$

After compensating for the estimated frequency offset $\hat{f}$, the resulting signal is given by $$r_2(t)=r_1(t)e^{-j2\pi \hat{f} t}, 0 \leq t \leq T_p+T_g. \quad (5)$$

The knowledge of the transmitted preamble waveform is then utilized to estimate the channel gain. A least squares estimate is given by $$\hat{h} = \frac{\int_0^{T_p+T_g} r_2(t) p^*(t) \, dt}{\int_0^{T_p+T_g} |p(t)|^2 \, dt}, \quad (6)$$

where p*(t) is the complex-conjugate of the transmitted preamble. Given the estimated channel gain, one embodiment obtains the minimum mean square error (MMSE) equalizer weight as $$w = \frac{\hat{h}^*}{|\hat{h}|^2 + \sigma_v^2}. \quad (7)$$

The frequency compensated signal $r_2(t)$ is after equalization then given by $$r_3(t)=wr_2(t), 0 \le t \le T_p+T_g. \quad (8)$$

The described operations can be implemented in the discrete time domain. The discrete-time representation of $r_3(t)$, denoted with $r_3[n]$, is further used to detect the corresponding payload symbols.

In the case of modulation formats which have finite constellation, such as MQAM and MPSK, the signal $r_3[n]$ is down-sampled to one sample per symbol and hard decisions on the payload symbols are made based on the minimal Euclidean distance. For example, in BPSK modulation format, a decision+1 (−1) is made if the sample in the corresponding signaling interval has positive (negative) real part. Alternatively, one embodiment can employ joint detection of the payload symbols from the upsampled version $r_3[n]$ and the knowledge of the mechanism which incurs memory in the MQAM or MPSK symbol sequence, such as pulse shaping. In the case of modulation formats with inherent memory, such as MSK family of modulation formats, the payload symbols are detected jointly using the Viterbi algorithm.

After the payload symbols of the extracted packet candidate are detected, the contribution of the extracted packet candidate in the input signal is estimated 605. In other words, estimation 605 determines what signal would be received if the extracted packet candidate was indeed transmitted through a unit gain channel. More specifically, if the estimated delay and frequency offset in iteration i are $\hat{\tau}_i$ and $\hat{f}_i$, respectively, the contribution of the extracted packet candidate is in the continuous time domain given by $$\hat{r}_i(t)=[p(t-\hat{\tau}_i)+g_k(t-\hat{\tau}_i)]e^{j2\pi\hat{f}_i(t-\hat{\tau}_i)}, \quad (9)$$

where $g_i(t)$ is the waveform obtained by modulating the detected payload symbols using the encoding and modulation formats employed in the system. The durations of the preamble and payload waveform are as before $T_p$ and $T_g$, respectively. This estimate of the contribution is stored in the temporary memory 606 and used in the current, as well as in the following iterations.

In some embodiments, all estimated contributions of the packet candidates up to the current iteration I are used to approximate the received signal. In other words, these embodiments seek coefficients $\hat{h}_1, \ldots, \hat{h}_I$ such that $$r(t) \approx \sum_{i=1}^{I} \hat{h}_i \hat{r}_i(t), \quad (10)$$

where, in fact, the unknown coefficients are estimates of the channel gains corresponding to the packet candidates extracted thus far, made at iteration I. A possible approach in solving for unknown coefficients in (10) is to minimize the power of the residual, defined as $$res(t)=r(t)-\sum_{i=1}^{I} \hat{h}_i \hat{r}_i(t). \quad (11)$$

Effectively this embodiment transforms orthogonal matching pursuit (OMP) sparse recovery method to find the least squares (LS) fit of the received signal and is framed and solved 607 in the discrete time domain. Alternatively, one embodiment can use a simpler method such as the one used in the matching pursuit (MP) for estimating unknown coefficients in (10).

The residual signal res(t) 608, which is the difference between the input signal and its current LS fit, is input in the cross-correlation 602 of the next iteration. The LS coefficients 633 in the very last iteration represent estimated channel gains corresponding to all extracted packet candidates and are stored in the memory unit 630. The control unit 620 ensures that the described procedure is run pre-defined number of iterations 610. Also, the control unit controls the switch 609 such that the input to the cross-correlator is the input signal 420 in the first iteration, and the residual signal 608 in all other iterations. The outputs from the described method are the contents of the memory unit 630, which represent the parameters and payload symbols of the extracted packet candidates.

Figure 6B:
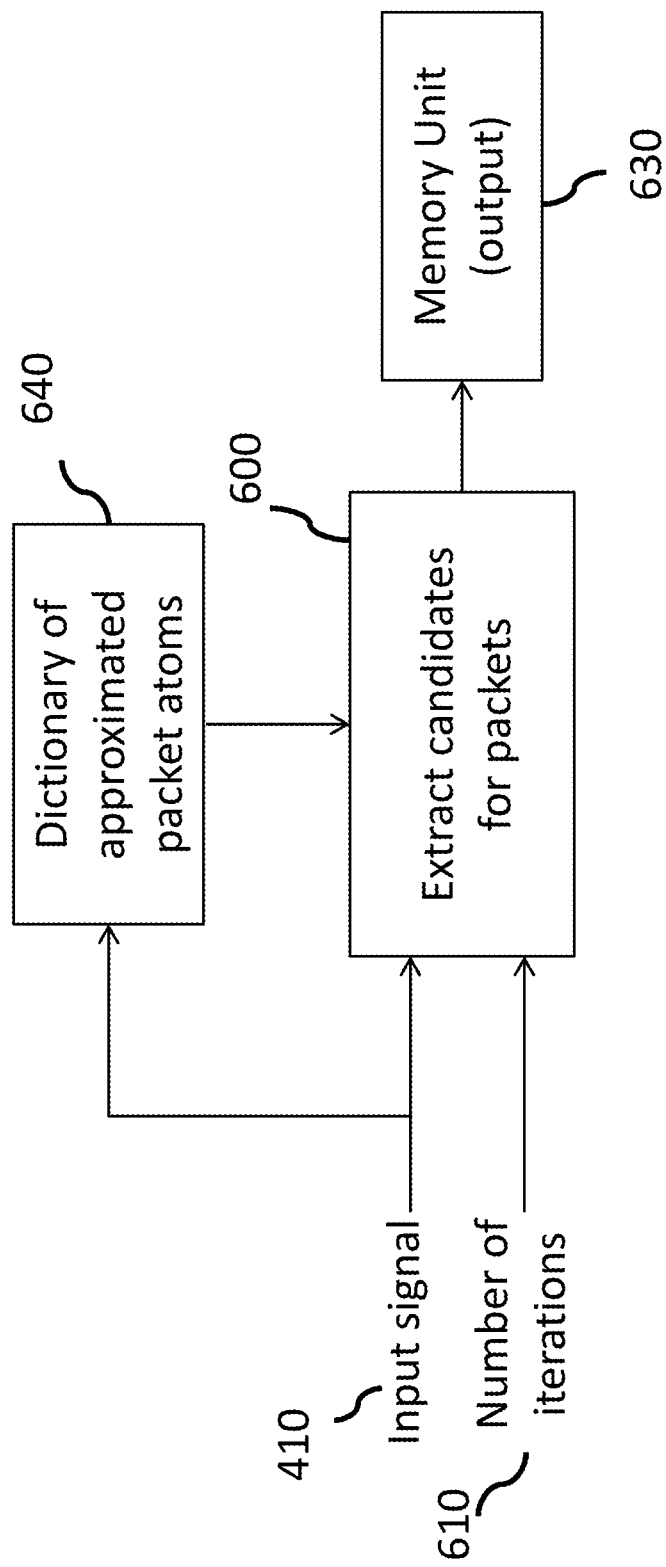
FIG. 6B is a block diagram of the sparse recovery method implemented during the first stage of the multi-stage packet separation according to another embodiment of the invention.

FIG. 6B shows a block diagram of the sparse recovery method implemented in the first stage according to another embodiment of the invention. This embodiment uses a dictionary of approximated packet atoms 640 in place of a dictionary of preamble atoms 601. This dictionary is formed from the input signal 420 and all combinations of delays and frequency offsets. All other processing steps are as already described in FIG. 6A.

Figure 6C:
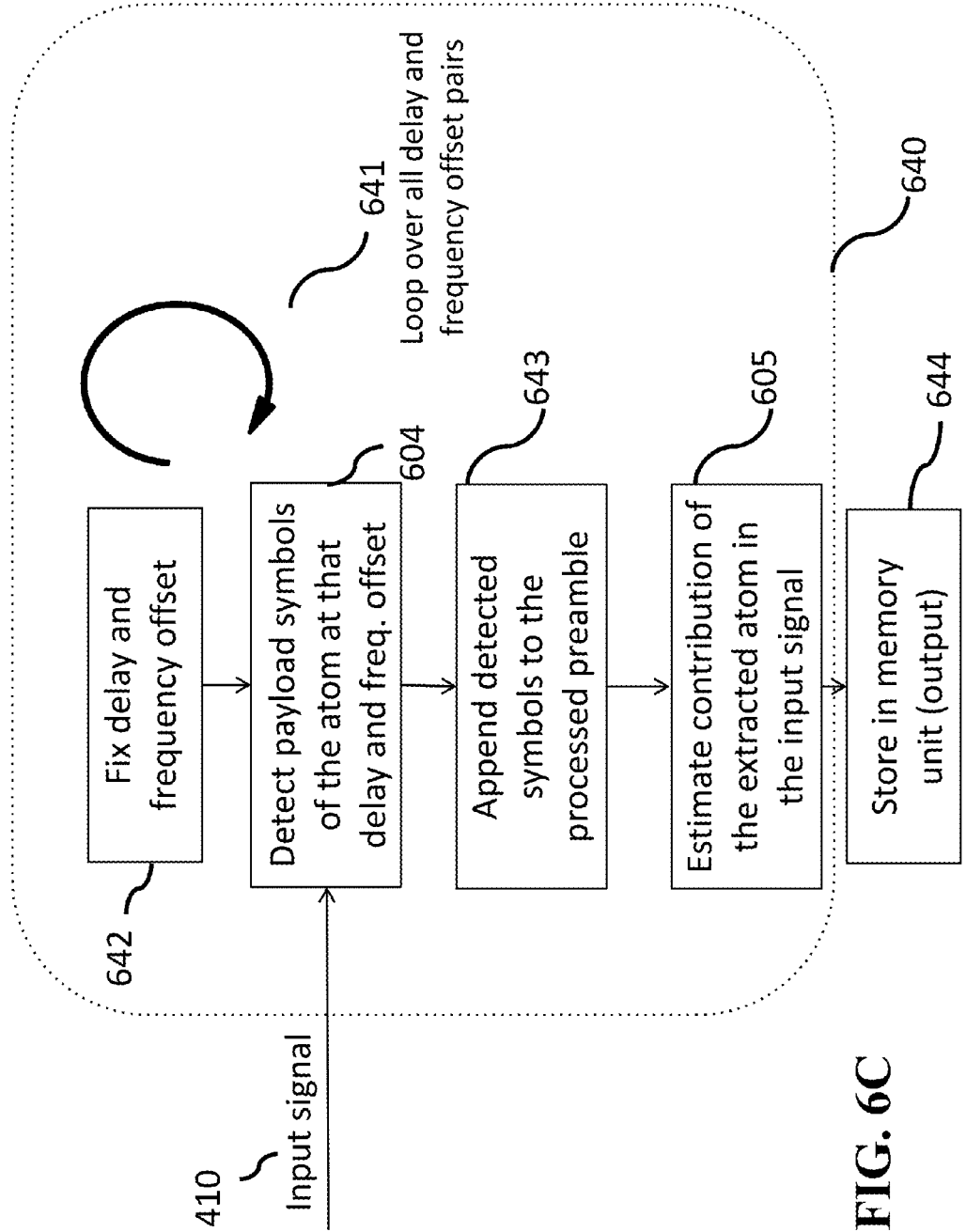
FIG. 6C is a block diagram of a method for determining a dictionary matrix of the approximated packet atoms according to one embodiment of the invention.

FIG. 6C shows a block diagram of a method for determining the dictionary of approximated packet atoms according to one embodiment of the invention. An iterative process 641 iterates over all possible combinations of delays and frequency offsets. For a particular delay and frequency offset 642, the embodiment detects 604 most likely payload symbols if a packet with such a delay and frequency offset indeed was present in the input signal 410. The detected payload symbols are appended 643 to the preamble and the contribution of such a packet in the input signal is evaluated 605 and stored in the memory unit 644. More specifically, an atom corresponding to a particular delay $\tau_l$ and frequency offset $f_l$ is in the continuous time domain given by $$a_l(t)=[p(t-\tau_l)+g_l(t-\tau_l)]e^{j2\pi f_l(t-\tau_l)}, \quad (12)$$

where $g_l(t)$ is the waveform portion due to payload. Conceptually, one might devise a single atom for each delay, frequency offset and payload realization.

However, for each delay and frequency offset, the number of possible payload realizations is exponential in the payload length. For example, in a simple case of BPSK modulation and 100-symbol payload, the number of possible payload realizations is $2^{100}$ for each $(\tau, f)$ pair. Performing sparse recovery using such a dictionary would be computationally prohibitive so we need to resort to approximations. A possible approximation is to represent all possible payload realizations with a single, most likely, payload realization for each $(\tau, f)$ pair, whose modulated waveform is $g_l(t)$ in (12).

The payload realization in question can be obtained by finding the most likely payload symbols corresponding to a packet with delay $\tau_l$ and frequency offset $f_l$ if indeed such a packet was transmitted. Framed in this way, the problem boils down to detecting payload symbols from the received signal r(t) corresponding to the delay $\tau_l$ and frequency offset $f_l$. The steps include (i) extracting from the received signal the portion corresponding to such a packet as in (4); (ii) compensating the frequency offset as in (5); (iii) estimating the corresponding channel gain (6), equalizer coefficient (7) and equalizing the segment corresponding to the payload waveform (8); and (iv) detecting the symbols optimally via Viterbi algorithm, or sub-optimally by downconverting the resulting signal and making hard decisions. All these steps have already been detailed.

Figure 6D:
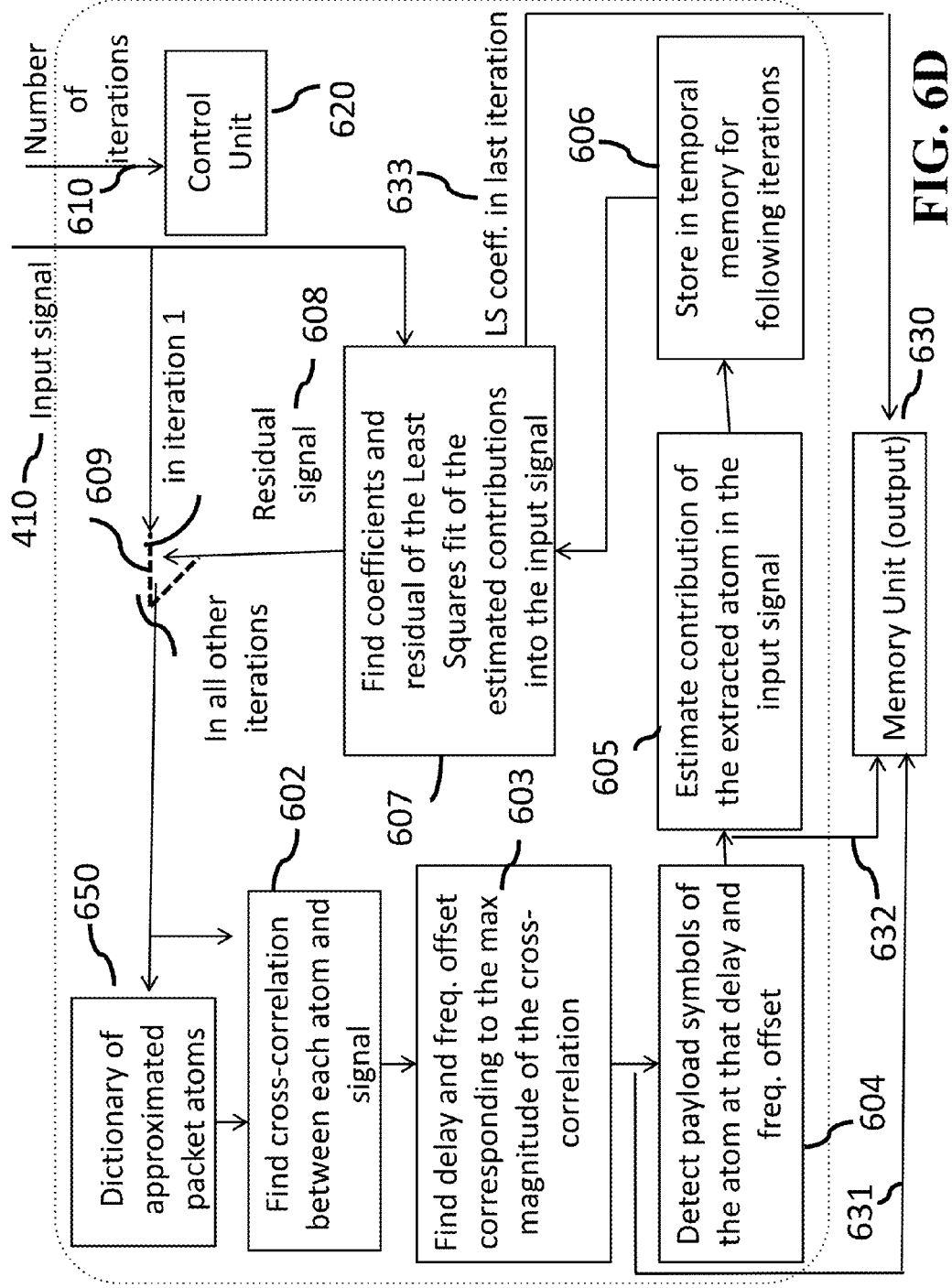
FIG. 6D is a block diagram of a method for updating the dictionary matrix according to one embodiment of the invention.

FIG. 6D shows a block diagram of a method for updating the dictionary matrix according to one embodiment of the invention. This embodiment updates the dictionary matrix 650 in response to the update of the received signal during the previous iteration. This embodiment is based on realization that because the input signal 410 is updated to produce the residual signal 608, the dictionary matrix has to be updated as well. Essentially, the only difference compared to the embodiment in FIG. 6B is that the dictionary matrix is built in each iteration. This is done using the residual signal as a received signal and following the same steps as in FIG. 6C.

Figure 6E:
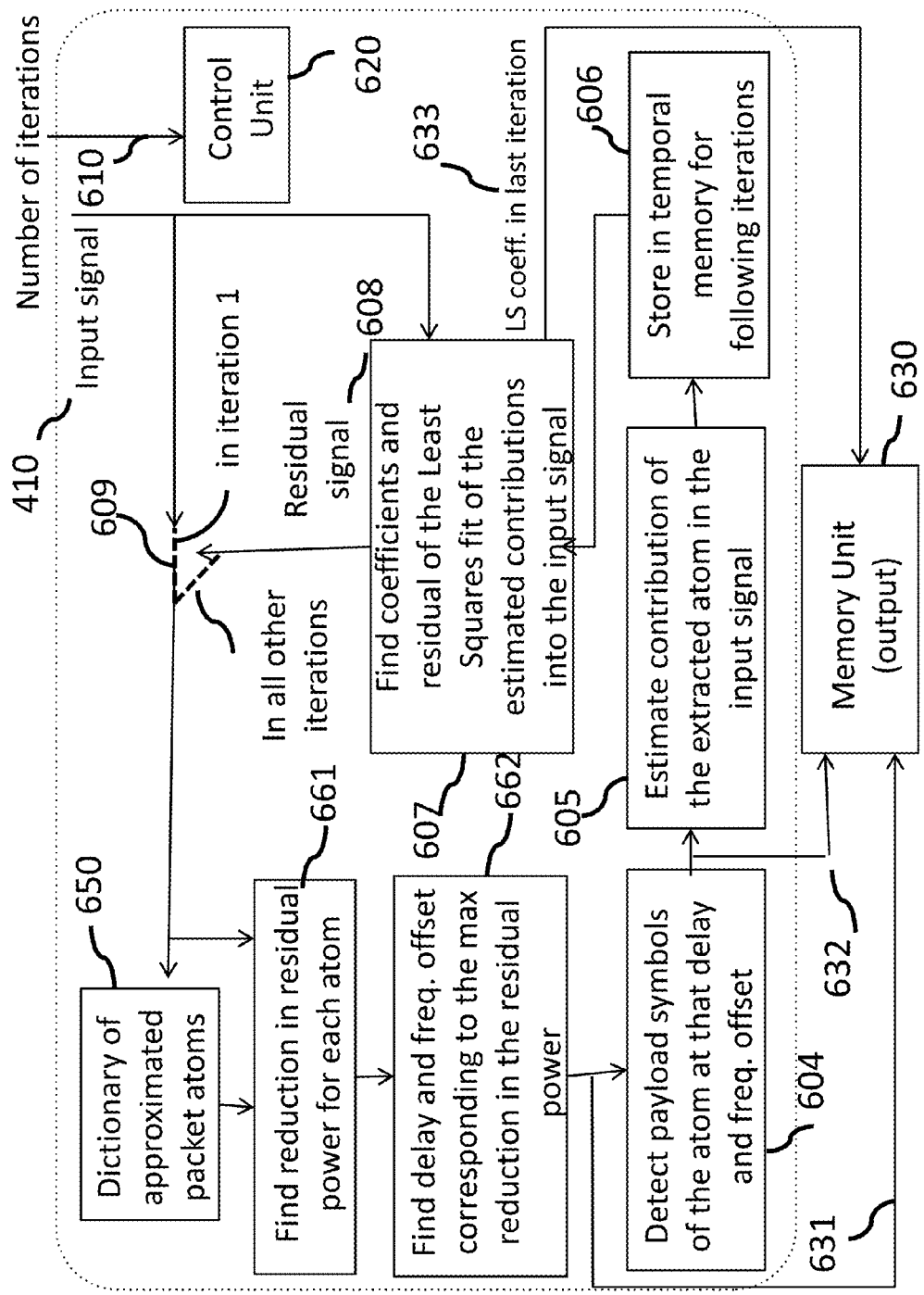
FIG. 6E is a block diagram of a method for accounting for a power of the residual signal according to one embodiment of the invention.

FIG. 6E shows a block diagram of a method for accounting for a power of the residual signal according to one embodiment of the invention. The reduction in the power of the residual signal resulting from choosing each element in the dictionary of approximated packet atoms is found 661. The delay and frequency offset corresponding to the element which leads to largest reduction in the residual power, found in 662, are those of an extracted packet candidate.

Different methods described for the first stage do not constitute an exhaustive list of possible processing approaches and different further modifications are possible. As such, one may obtain the residual signal 608 in all embodiments as the difference between the input signal 410 and the sum of the estimated contributions from 606. Also, the objective function based on the residual power 661 can be used in embodiments shown in FIGS. 6A, 6B and 6D, instead of the one based on cross-correlations 602.

Figure 7A:
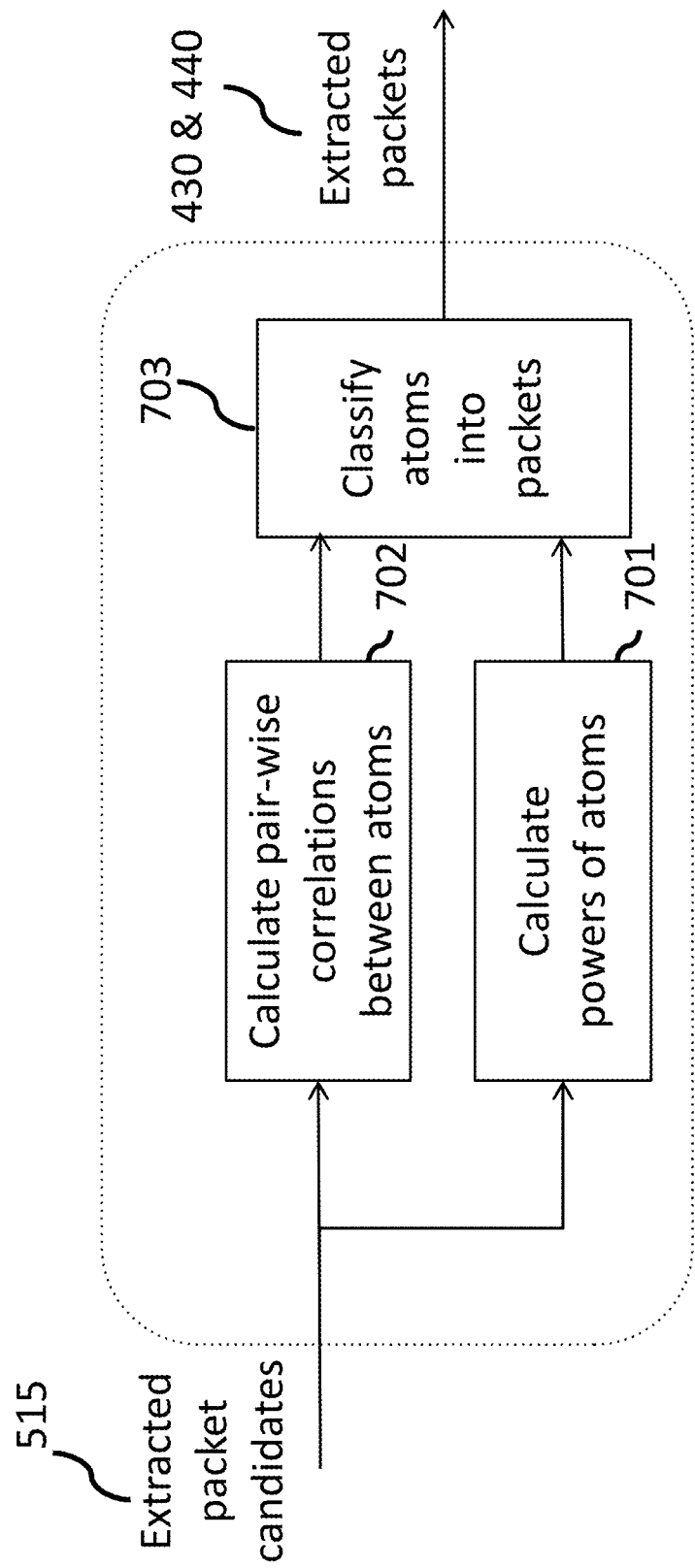
FIGS. 7A and 7B are block diagrams of a method of the second stage of the multi-stage packet separation according to different embodiments of the invention.
Figure 7B:
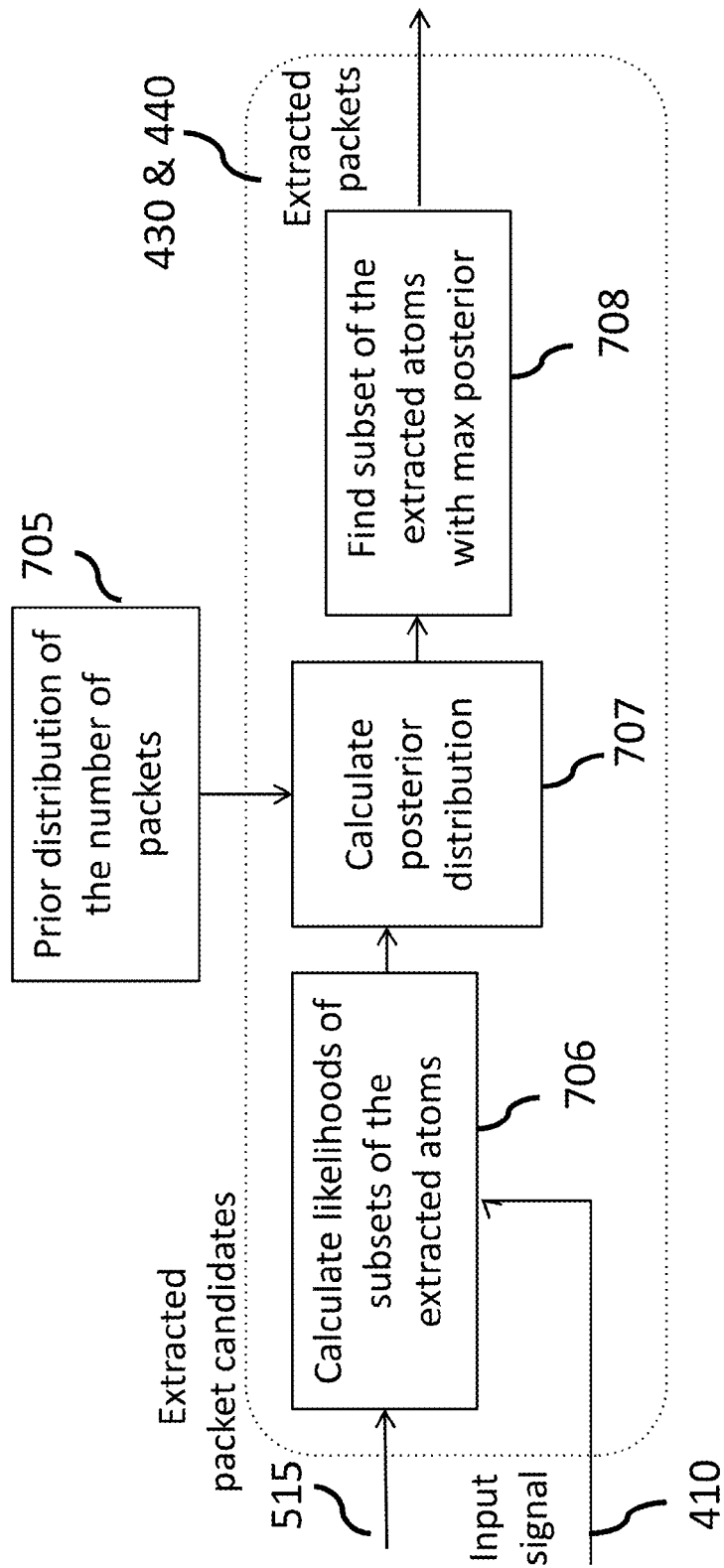

FIG. 7A shows a block diagram of a method of the second stage which classifies packet candidates and rejects those that are likely noise explaining. Effectively, this embodiment determines which packet candidates are indeed packets. For example, the embodiment computes the powers in 701 and pairwise correlations in 702 of all extracted packet candidates 515, which are read from the memory unit 630. The classification step 703 first discards candidates for which the ratio between the measured power and the maximum power among all extracted atoms falls below certain threshold $\eta_{max}$. In the second step, the classification device 703 finds, if any, candidates whose pair-wise correlations are above a certain threshold $r_{min}$ and discards the one with the smaller power. The surviving candidates are the extracted packets, whose number is the estimated number of colliding packets 430 with the corresponding parameters being the estimated parameters of the colliding packets 440. The thresholds $\eta_{max}$ and $r_{min}$ are application-specific and can be specified by a user. FIG. 7B shows a block diagram of another method for the second stage. This embodiment uses a probabilistic approach and evaluates a posterior distribution 707 for each possible combination of the extracted packet candidates. That is, the posterior distribution that the input signal 410 includes particular k packet candidates extracted during the first stage, is evaluated from the likelihood 706 that the input signal includes those extracted candidates, and a pre-specified prior probability 705 that there are k colliding packets in the input signal. To reduce a potential computational burden arising when the number of extracted packet candidates is relatively large, one implementation evaluates posterior that there are k colliding packets by considering only first k extracted candidates. A variety of other approaches are possible.

Figure 8A:
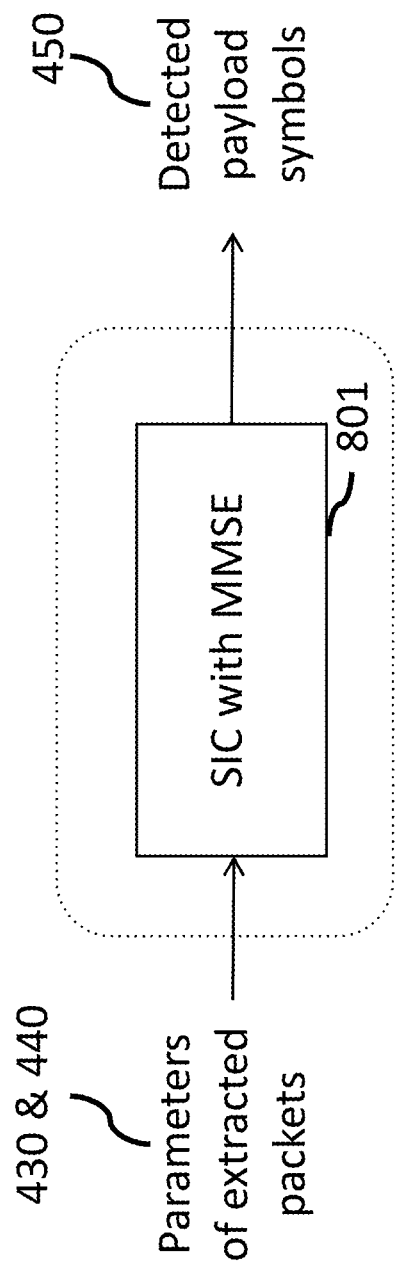
FIGS. 8A, 8B, and 8C are block diagrams of a method of the third stage of the multi-stage packet separation according to different embodiments of the invention.
Figure 8B:
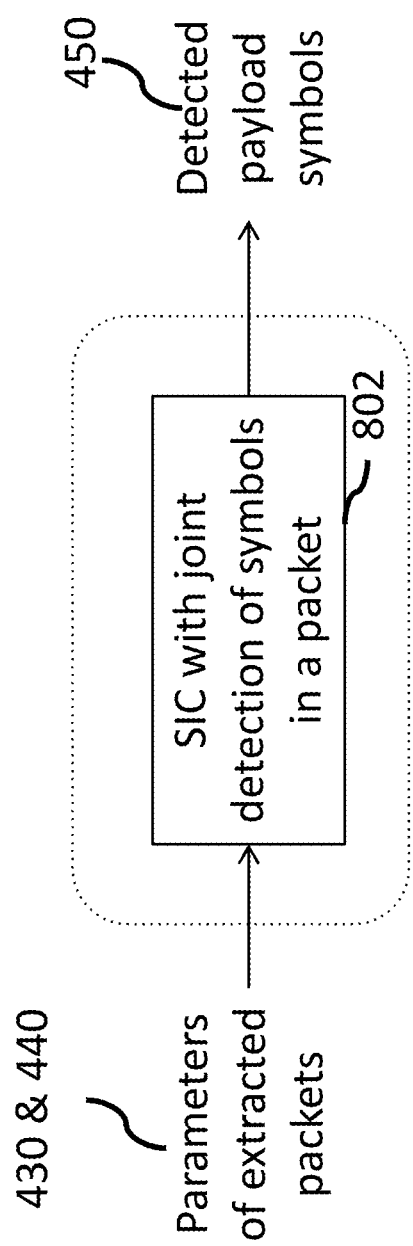
Figure 8C:
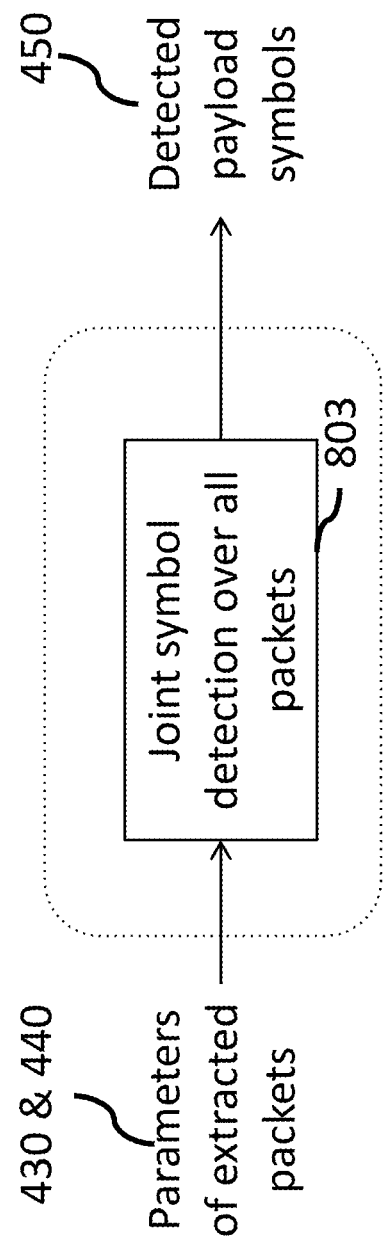

FIGS. 8A, 8B, and 8C show block diagrams of a method of the thirst stage for packets extraction according to different embodiments of the invention. The time and frequency offsets and channel gains of colliding packets, estimated in the previous two stages, serve as complete description of all channels. Therefore, those parameters are used as an input to a payload symbol detector based on, e.g., Successive Interference Cancellation (SIC) method. The SIC is an iterative method whose number of iterations is equal to the number of colliding packets, and which, in each iteration, estimates payload symbols corresponding to a single packet.

The payload symbol detection in each iteration can be based on MMSE 801, as shown in FIG. 8A. Alternatively, another embodiment uses joint detection of payload symbols by means of the belief propagation (BP), i.e., Viterbi algorithm 802, as shown in FIG. 8B. In yet another embodiment, the method of the third stage jointly detects payload symbols off all colliding packets using the belief propagation (BP) 803 approach, as shown in FIG. 8C. The joint symbol detection in FIG. 8C is optimal from the sequence Maximum Aposteriori Probability (MAP) viewpoint.

In some embodiments, the k-th SIC iteration detects payload symbols corresponding to the k-th most powerful packet. The iteration takes as an input the residual signal $\tilde{r}^{(k)}(t)$, which is an output from the previous iteration. Assuming that the estimated delay of the considered packet is $\hat{\tau}_k$, the segment corresponding to the considered packet is obtained as $$\tilde{r}_1(t) = \tilde{r}^{(k)}(t+\hat{\tau}_k), 0 \le t \le T_p + T_g. \quad (13)$$

Assuming that the estimated frequency offset of the considered packet is $\hat{f}_k$, the frequency compensation is applied so that $$\tilde{r}_2(t) = \tilde{r}_1(t)e^{-j2\pi\hat{f}_k t}, 0 \le t \le T_p + T_g. \quad (14)$$

The frequency compensated signal $\tilde{r}_2(t)$ is equalized using the minimum mean square error(MMSE) equalizer whose weight is computed from the estimated channel gain corresponding to the considered packet, $\hat{h}_k$. The equalized signal is thus given by $$\tilde{r}_3(t) = \frac{\hat{h}_k^*}{|\hat{h}_k|^2 + \sigma_v^2} \tilde{r}_2(t). \quad (15)$$

The payload symbols corresponding to the considered packet can be detected by downsampling the discrete-time version of $\tilde{r}_3(t)$ to 1 sample per symbol and making hard decision in each signaling interval. The downsampling is done such that the sample in each signaling interval is ISI (Inter-Symbol Interference) free. This is possible because the channel is flat fading and the receiver knows which shaping pulse has been used on the transmitter side. We refer to this method as the SIC with MMSE detection 801. Alternatively, if either or combination of the channel, encoding method, modulation format, or pulse shaping introduce memory in the symbol sequence, the Viterbi algorithm applied over the discrete-time version of $\tilde{r}_3(t)$ (with or without downsampling) can be employed for joint detection of payload symbols. This method is referred herein as the SIC with joint symbol detection in a packet 802.

After the payload symbols are detected, the contribution of such a packet in the received signal is estimated using the preamble and payload symbols and estimated delay, frequency offset and channel gain. The estimated contribution is subtracted from the current residual signal $\tilde{r}^{(k)}(t)$ to produce the updated residual signal for next iteration $\tilde{r}^{(k+1)}(t)$. Overall, the updated residual signal is given by $$\tilde{r}^{(k+1)}(t) = \tilde{r}^{(k)}(t) - \hat{h}_k[p(t-\hat{\tau}_k) + g_k(t-\hat{\tau}_k)]e^{j2\pi\hat{f}_k(t-\hat{\tau}_k)}. \quad (16)$$

The updated residual is fed back to the next iteration and all the described steps are repeated until payload symbols of all extracted packets are detected.

Figure 9A:
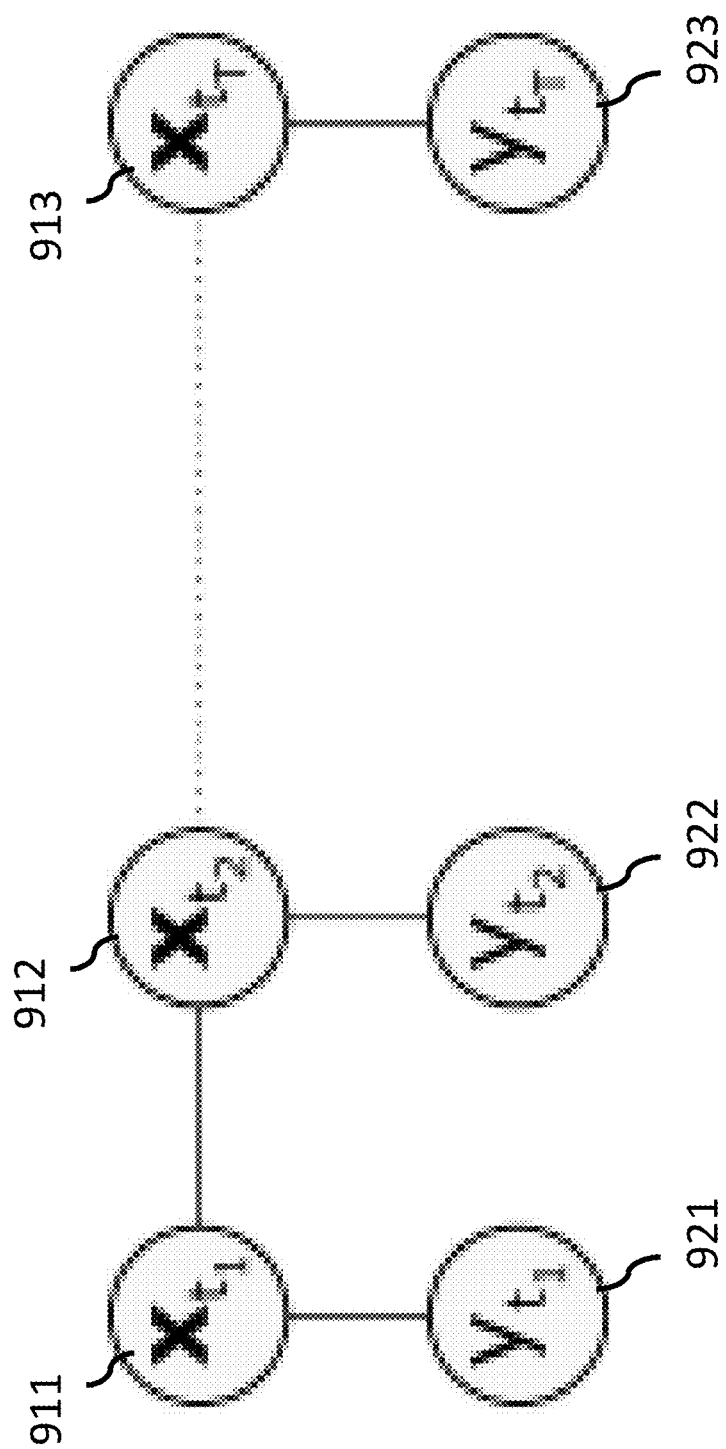
FIG. 9A is a schematic of graphical model used for joint payload symbol detection.
Figure 9B:
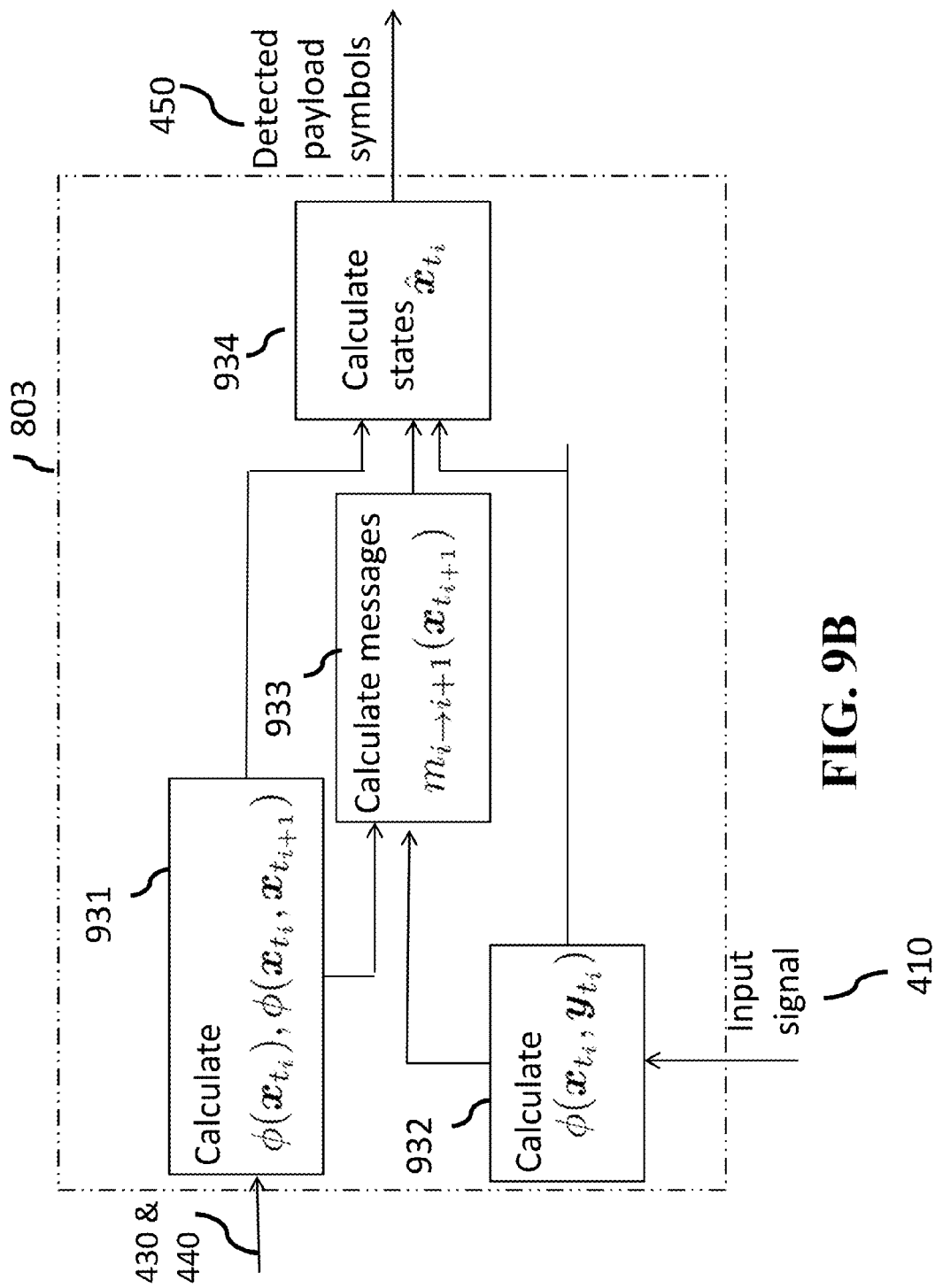
FIG. 9B is a block diagram of a method for joint symbol detection for rectangular pulse shaping according to one embodiment of the invention.
Figure 10:
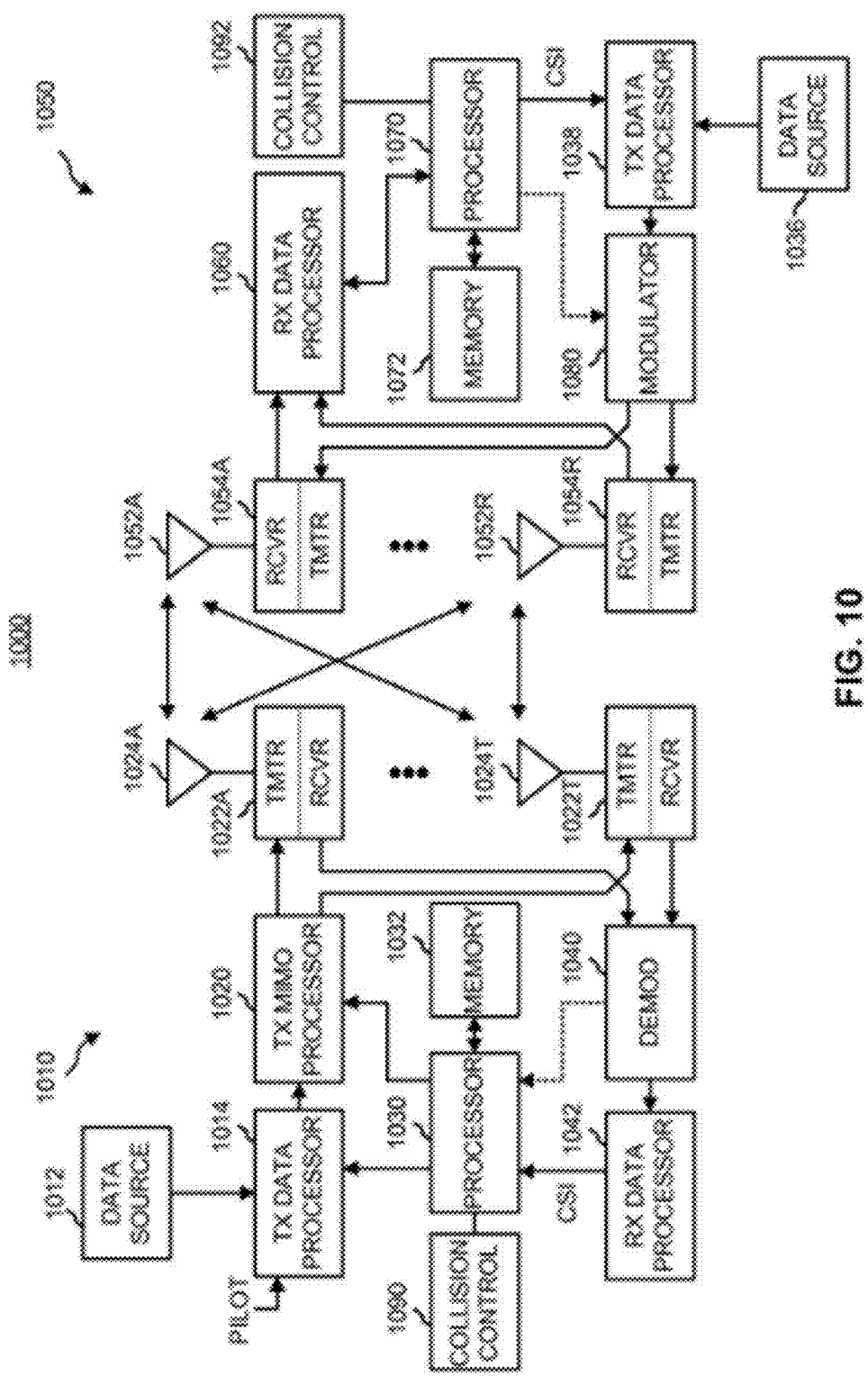
FIG. 10 is a block diagram of different devices employing some principles of different embodiments of the invention.

FIG. 9B shows a block diagram of a method for joint symbol detection for rectangular pulse shaping and BPSK modulation, according to one embodiment of the invention. Here we provide more details of this approach and point out that it is also applicable when other shaping pulses and modulation formats are employed, however with higher computational complexity.

The embodiment models the joint symbols detection problem by means of a simple graphical model, depicted in FIG. 9A. For example, the received signal r(t) is sampled at discrete time instants $t=t_1, \ldots, t_N$, where N is the overall number of samples in the received signal. The sampling period is $T_c$ and the number of samples in the preamble and payload in each packet is $M_1$ and $M_2$, respectively, such that $M_1 T_c = T_p$ and $M_2 T_c = T_g$. Finally, we define $y_t = r(t)$ 921, 922, 923.

Each discrete time instant $t=t_1, \ldots, t_N$, is associated with a vector variable $x_t = [x_{t1}, \ldots, x_{tK}]$ 911, 912, 913, containing symbols corresponding to each of the K packets. For a simple BPSK case, $x_{tk} \in \{0, +1, -1\}$, where 0 is used to describe that the corresponding packet does not contain a symbol at a particular time instant $t_i$. The node potentials on the graph in 931 are defined according to $$\varphi(x_t) \equiv \Pi_{j=1}^{K} \varphi(x_{tj}), \quad (17)$$

where $\varphi(x_{tj})$ captures the constraints on the symbol value of the jth packet at time t given the estimated packet delay $\hat{\tau}_j$ $$\varphi(x_{tj}) \equiv \begin{cases} \delta(x_{tj}) & t < \hat{\tau}_j \\ \delta(x_{tj} - p(t - \hat{\tau}_j)) & \hat{\tau}_j \leq t < \hat{\tau}_j + M_1 T_c \\ \delta(x_{tj} - 1) + \delta(x_{tj} + 1) & \hat{\tau}_j + M_1 T_c \leq t < \hat{\tau}_j + (M_1 + M_2) T_c \\ \delta(x_{tj}) & \hat{\tau}_j + (M_1 + M_2) T_c \leq t \end{cases} \quad (18)$$

This forces the corresponding variable to zero outside the packet extent, sets it to match the preamble symbol during the initial length-$M_1$ preamble window, and allows either +1 or −1 during the length-$M_2$ payload window.

Additionally or alternatively, one embodiment defines pairwise potentials $\varphi(x_t, y_t)$ in 932 to describe the connection between the underlying symbols $x_t$ and measurement $y_t$, given the estimates $\hat{h}_j$, $\hat{f}_j$ and the noise variance $\sigma_v^2$ according to $$\varphi(x_t, y_t) \equiv \mathcal{CN}(y_t; \Sigma \hat{h}_j x_{tj} e^{j2\pi \hat{f}_j t}, \sigma_v^2), \quad (19)$$

where $\mathcal{CN}(y; \mu, \sigma^2)$ is the circularly-symmetric Gaussian density function with mean $\mu$ and variance $\sigma^2$, evaluated at y.

The sample transitions structure can be described by introducing transition potentials in 931 as $$\mu(x_{t_i}, x_{t_{i+1}}) \equiv \Pi_{j=1}^{K} \varphi(x_{t_i,j}, x_{t_{i+1},j}), \quad (20)$$

with the definition $$\varphi(x_{t_i,j}, x_{t_{i+1},j}) \equiv \begin{cases} 1 & \frac{t_i - \hat{\tau}_j}{T_c} < \frac{t_{i+1} - \hat{\tau}_j}{T_c} \\ \delta(x_{t_{i+1},j} - x_{t_i,j}) & \text{else} \end{cases} \quad (21)$$

This enforces a symbol structure corresponding to the estimated packet delays, such that for a given packet, transitions are allowed only between time samples that correspond to different symbol slots. This definition only has meaning during the packet's temporal extent, however, we arbitrarily extend it to the full time record as the node potential priors outside the packet strictly enforce $x_{tj}=0$ everywhere such that the transition potentials so defined do not change the solution to the inference problem.

With the above definitions in place some embodiment solve for the MAP estimator for $x=[x_{t_1}, \ldots, x_{t_N}]$, given the observations $$y = [y_{t_1}, \ldots, y_{t_N}] \, x(y) = \quad (22)$$

$$\operatorname{argmax}_{x_{t_1}, \ldots, x_{t_N}} \Pi_i \, \varphi(x_{t_i}) \varphi(x_{t_i}, y_{t_i}) \Pi_i \, \varphi(x_{t_i}, x_{t_{i+1}})$$

For example, one embodiment determines the solution using a max-product method, whose steps are concisely summarized below $$m_{1 \to 2}(x_{t_2}) = \max_{x_{t_1}} \varphi(x_{t_1}) \varphi(x_{t_1}, y_{t_1}) \varphi(x_{t_1}, x_{t_2})$$

$$m_{i \to i+1}(x_{t_{i+1}}) = \max_{x_{t_i}} m_{i-1 \to i}(x_{t_i}) \varphi(x_{t_i}) \varphi(x_{t_i}, y_{t_i}) \varphi(x_{t_i}, x_{t_{i+1}})$$

$$x_{t_N} = \operatorname{argmax}_{x_{t_N}} m_{N-1 \to N}(x_{t_N}) \varphi(x_{t_N}) \varphi(x_{t_N}, y_{t_N})$$

$$x_{t_i}(x_{t_{i+1}}) = \operatorname{argmax}_{x_{t_i}} m_{i-1 \to i}(x_{t_i}) \varphi(x_{t_i}) \varphi(x_{t_i}, y_{t_i}) \varphi(x_{t_i}, x_{t_{i+1}})$$

$$x_{t_1}(x_{t_2}) = \operatorname{argmax}_{x_{t_1}} \varphi(x_{t_1}) \varphi(x_{t_1}, y_{t_1}) \varphi(x_{t_1}, x_{t_2}),$$

where the second and forth lines hold for $i=2, \ldots, N-1$. The first two lines compute messages and are implemented in 933, while the last three lines deliver state estimates and are implemented in 934.

One embodiment first traverses the graph from left to right passing messages $m_{i \to i+1}(x_{t_{i+1}})$ in 933 until finally reaches the right end and evaluate $x_{t_N}$. Next, the embodiment backtracks from right to left calculating $x_{t_{N-1}}, \ldots, x_{t_1}$ in 934, which completes the MAP estimation of the full sequence x, and the payload symbols 450 corresponding to all K packets.

Recalling that the computational complexity of the belief propagation procedure scales as $O(|x|^2 N)$ where $|x|=3^K$ is the size of the signal set, the overall computational complexity of the joint payload symbol detection is $O(9^K N)$. Note that while the complexity is exponential in the number of colliding packets K, it is linear in the number of payload symbols per packet.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UNITS"). The teachings herein may be implemented in a 3GPP Long Term Evolution ("LTE") system, an Ultra-Mobile Broadband ("UMB") system, and other types of systems. LTE is a release of UNITS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1×RTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner(e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding a set of packets asynchronously transmitted on a nominal carrier frequency over a common communication medium, comprising:

receiving a signal including a combination of the set of packets modified with noise of the common communication medium, each packet includes a preamble common to all packets in the set and a payload unique for at least some packets in the set;

determining, using a sparse recovery, a frequency offset of the transmission of each packet from the carrier frequency, a time offset of the transmission of each packet from a common point in time, and a channel gain corresponding to the transmission of each packet over a channel in the common communication medium, wherein the sparse recovery uses a dictionary matrix approximated with the preamble of the packets, but without using the payloads of the packets, or approximated with a combination of the preamble with a single payload for each combination of the frequency and the time offsets; and decoding the payloads of the packets in the set using the frequency offsets, the time offsets, and the channel gains.

2. The method of claim 1, further comprising:

determining a dictionary matrix having only one atom for each combination of the frequency and the time offsets, such that each atom of the dictionary represents a packet having only the preamble and transmitted over a channel having a corresponding combination of the frequency and the time offsets; and determining a set of non-zero channel gains defining a set of atoms of the dictionary matrix, such that transmission of the atoms from the set with the corresponding non-zero channel gains approximates the received signal.

3. The method of claim 1, further comprising:

determining a single combination of the preamble with a payload for each combination of the frequency and the time offsets;

determining a dictionary matrix having only one atom for each combination of the frequency and the time offsets, wherein each atom represents a packet including the preamble and the payload determined for a corresponding combination of the frequency and the time offsets and transmitted over a channel having the corresponding combination of the frequency and the time offsets; and determining a set of non-zero gains defining a set of atoms of the dictionary matrix, such that transmission of the atoms from the set with the corresponding non-zero gains approximates the received signal.

4. The method of claim 3, further comprising:

determining a most likely payload as a single payload for each combination of the frequency and the time offsets.

5. The method of claim 1, the payloads are decoded iteratively within iterations of the sparse recovery until a termination condition is met, an iteration comprising:

cross-correlating the received signal with each element of a dictionary matrix of the sparse recovery, wherein each element of the dictionary matrix is a packet transmitted over a channel for a combination of the frequency and the time offsets;

selecting the combination of the frequency and the time offsets corresponding to the largest magnitude of the cross-correlating; and determining the payload of the packet transmitted over the channel for the selected combination of the frequency and the time offsets.

6. The method of claim 5, wherein the iteration further comprises:

removing contributions of the packets having the preamble and the payload and transmitted over the selected combinations of the frequency and the time offsets from the received signal, such that the received signal is updated for subsequent iterations.

7. The method of claim 6, wherein the iteration further comprises:

updating the dictionary matrix in response to the update of the received signal during the previous iteration.

8. The method of claim 5, wherein the iterations of the sparse recovery produces a predetermined number of candidates packets, further comprising:

classifying which candidate packets are accepted candidate packets and which candidate packets are rejected candidate packets.

9. The method of claim 8, wherein the rejected candidate packets have power less than a predetermined percentage of the largest power among the candidate packets or have pairwise correlation with the accepted candidate packets less than a threshold.

10. The method of claim 8, wherein the rejecting comprises:

determining the probability of the candidate packet to be the transmitted packet using a prior probability for a number of transmitted packets in the input signal.

11. The method of claim 1, wherein the decoding comprising:

decoding the payloads separately or jointly using an estimation of the common communication media defined by the frequency offsets, the time offsets, and the channel gains.

12. The method of claim 11, wherein the decoding uses one or combination of an optimal belief propagation (BP) across all packets, a successive interference cancellation where each packet is decoded separately using linear equalization followed by hard decoding, and an Viterbi decoding.

13. A receiver for decoding a set of packets asynchronously transmitted a nominal carrier frequency over a common communication medium, comprising:

an antenna to receive the set of packets asynchronously transmitted over the common communication medium;

a front end to produce a signal including a combination of the set of packets modified with noise in the common communication medium, wherein each packet includes a preamble common for all packets in the set and a payload unique for at least some packets in the set;

a channel estimator, including a processor and a memory, to determine, using a sparse recovery, a frequency offset of the transmission of each packet from the carrier frequency, a time offset of the transmission of each packet from a common point in time, and a channel gain corresponding to the transmission of each packet over a channel in the common communication medium, wherein the memory stores a dictionary matrix having only one atom for each combination of the frequency and the time offsets, such that each atom of the dictionary represents a packet having only the preamble and transmitted over a channel having a corresponding combination of the frequency and the time offsets, and wherein the processor determines a set of non-zero channel gains defining a set of atoms of the dictionary matrix, such that transmission of the atoms from the set with the corresponding non-zero channel gains approximates the received signal; and a decoder to decode the payloads of the packets in the set using the frequency offsets, the time offsets, and the channel gains.

14. The receiver of claim 13, wherein the sparse recovery uses a dictionary matrix approximated with the preamble of the packets, but without using the payloads of the packets, or approximated with a combination of the preamble with a single payload for each combination of the frequency and the time offsets.

15. The receiver of claim 13, wherein the processor determines a single combination of the preamble with a most likely payload for each combination of the frequency and the time offsets to produce a dictionary matrix having only one atom for each combination of the frequency and the time offsets, each atom represents a packet including the preamble and the payload determined for a corresponding combination of the frequency and the time offsets and transmitted over a channel having the corresponding combination of the frequency and the time offsets, and determines a set of non-zero gains defining a set of atoms of the dictionary matrix, such that transmission of the atoms from the set with the corresponding non-zero gains approximates the received signal.

16. The receiver of claim 13, wherein the channel estimator iteratively determines candidate payloads for candidate packets corresponding to the frequency offsets, the time offsets, and the channel gains, wherein during an iteration the channel estimator cross-correlates the received signal with each element of a dictionary matrix of the sparse recovery, wherein each element of the dictionary matrix is a packet transmitted over a channel for a combination of the frequency and the time offsets, selects the combination of the frequency and the time offsets corresponding to the largest magnitude of the cross-correlating, determines the payload of the packet transmitted over the channel for the selected combination of the frequency and the time offsets, and removes a contribution of the packet having the preamble and the payload and transmitted over the selected combination of the frequency and the time offsets from the received signal, such that the received signal is updated for subsequent iterations.

17. The receiver of claim 13, wherein the channel estimator classifies which candidate packets are indeed packets, and wherein the decoder decodes the payloads separately or jointly using an estimation of the common communication media defined by the frequency offsets, the time offsets, and the channel gains of remaining candidate packets.

18. A computer implemented method for decoding a set of packets asynchronously transmitted on a nominal carrier frequency, comprising a processor for performing steps of the method, comprising:

determining, for each transmitted packet including a preamble common for all packets in the set and a payload unique for at least some packets, a frequency offset of the transmission of the packet from the carrier frequency, a time offset of the transmission of the packet from a common point in time, and a channel gain corresponding to the transmission of the packet, wherein the determining uses a sparse recovery with a dictionary matrix based only on the preamble of the packets or based on a combination of the preamble with payloads approximated for each combination of the frequency offset and the delay;

determining a single combination of the preamble with a payload for each combination of the frequency and the time offsets;

determining a dictionary matrix having only one atom for each combination of the frequency and the time offsets, wherein each atom represents a packet including the preamble and the payload determined for a corresponding combination of the frequency and the time offsets and transmitted over a channel having the corresponding combination of the frequency and the time offsets; and determining a set of non-zero gains defining a set of atoms of the dictionary matrix, such that transmission of the atoms from the set with the corresponding non-zero gains approximates the received signal; and decoding the set of packets using corresponding frequency offsets, delays, and channel gains.

19. A receiver for decoding a set of packets asynchronously transmitted a nominal carrier frequency over a common communication medium, comprising:

an antenna to receive the set of packets asynchronously transmitted over the common communication medium;

a front end to produce a signal including a combination of the set of packets modified with noise in the common communication medium, wherein each packet includes a preamble common for all packets in the set and a payload unique for at least some packets in the set;

a channel estimator, including a processor and a memory, to determine, using a sparse recovery, a frequency offset of the transmission of each packet from the carrier frequency, a time offset of the transmission of each packet from a common point in time, and a channel gain corresponding to the transmission of each packet over a channel in the common communication medium, wherein the channel estimator iteratively determines candidate payloads for candidate packets corresponding to the frequency offsets, the time offsets, and the channel gains, wherein during an iteration the channel estimator cross-correlates the received signal with each element of a dictionary matrix of the sparse recovery, wherein each element of the dictionary matrix is a packet transmitted over a channel for a combination of the frequency and the time offsets, selects the combination of the frequency and the time offsets corresponding to the largest magnitude of the cross-correlating, determines the payload of the packet transmitted over the channel for the selected combination of the frequency and the time offsets, and removes a contribution of the packet having the preamble and the payload and transmitted over the selected combination of the frequency and the time offsets from the received signal, such that the received signal is updated for subsequent iterations; and a decoder to decode the payloads of the packets in the set using the frequency offsets, the time offsets, and the channel gains.

* * * * *